United States Patent
Lanigan et al.

(10) Patent No.: US 7,059,159 B2
(45) Date of Patent: Jun. 13, 2006

(54) SECURITY SYSTEM FOR CARGO TRAILERS

(75) Inventors: William P. Lanigan, Orland Park, IL (US); Peter W. Mirabella, Schereville, IN (US); Gerald F. Chalko, Jr., Highland, IN (US); Kurt A. Moldenhauer, Valparaiso, IN (US); Maciej Labowicz, Roselle, IL (US)

(73) Assignee: Mi-Jack Products, Inc., Hazel Crest, IL (US)

( * ) Notice: Subject to any disclaimer, the term of this patent is extended or adjusted under 35 U.S.C. 154(b) by 0 days.

(21) Appl. No.: 10/360,521

(22) Filed: Feb. 6, 2003

(65) Prior Publication Data

US 2004/0155477 A1    Aug. 12, 2004

(51) Int. Cl.
*E05B 47/00* (2006.01)
*E05B 65/12* (2006.01)
*E05C 1/06* (2006.01)

(52) U.S. Cl. .......................... 70/280; 70/257; 292/144; 340/5.5; 340/5.7

(58) Field of Classification Search ................ 340/5.5, 340/5.73; 292/144, 210, 61, 129; 70/280, 70/257
See application file for complete search history.

(56) References Cited

U.S. PATENT DOCUMENTS

| | | | |
|---|---|---|---|
| 4,083,424 A * | 4/1978 | von den Stemmen et al. .................... | 70/278.1 |
| 4,799,719 A * | 1/1989 | Wood ..................... | 292/144 |
| 5,473,922 A * | 12/1995 | Bair et al. .................... | 292/144 |
| 5,755,126 A | 5/1998 | Lanigan et al. | |
| 5,781,399 A | 7/1998 | Lanigan et al. | |
| 5,806,355 A | 9/1998 | Lanigan et al. | |
| 5,931,033 A | 8/1999 | Lanigan et al. | |
| 6,047,576 A | 4/2000 | Lanigan et al. | |
| 6,049,448 A * | 4/2000 | Lanigan et al. ............. | 361/172 |
| 2003/0179073 A1 | 9/2003 | Ghazarian | |

OTHER PUBLICATIONS

Maplelock Air Brochure (2 pgs), date unknown.
Maple Technology Webpage (2 pgs) Aug. 20, 2002.
Maple Fleet Technology Cryptalock/Loadlocker Brochure, date unknown.
Maple Fleet Technology Freightlock Brochure, date unknown.
Brochure: Electronic Roll Door Lock (Mi-Jack Products; approx. 1998).
Mi-Jack Products Installer/Operator Manual entitled "Power In-Lock ™", 1998.

* cited by examiner

*Primary Examiner*—Brian Zimmerman
*Assistant Examiner*—Clara Yang
(74) *Attorney, Agent, or Firm*—George H. Gerstman; Seyfarth Shaw LLP

(57) ABSTRACT

An apparatus to secure a door of a cargo container. The apparatus includes a latching device and a cover can be positioned over at least a portion of the latching device. The latching device is positioned within a housing. At least one pad is positioned between the latch and the housing. The latching device includes a screw for moving the latch between an open position and a closed position and a rotary motor for turning the screw. A pre-compressed spring is coupled to the latch and the screw for exerting a force to Increase friction and prevent back rotation of the screw.

7 Claims, 31 Drawing Sheets

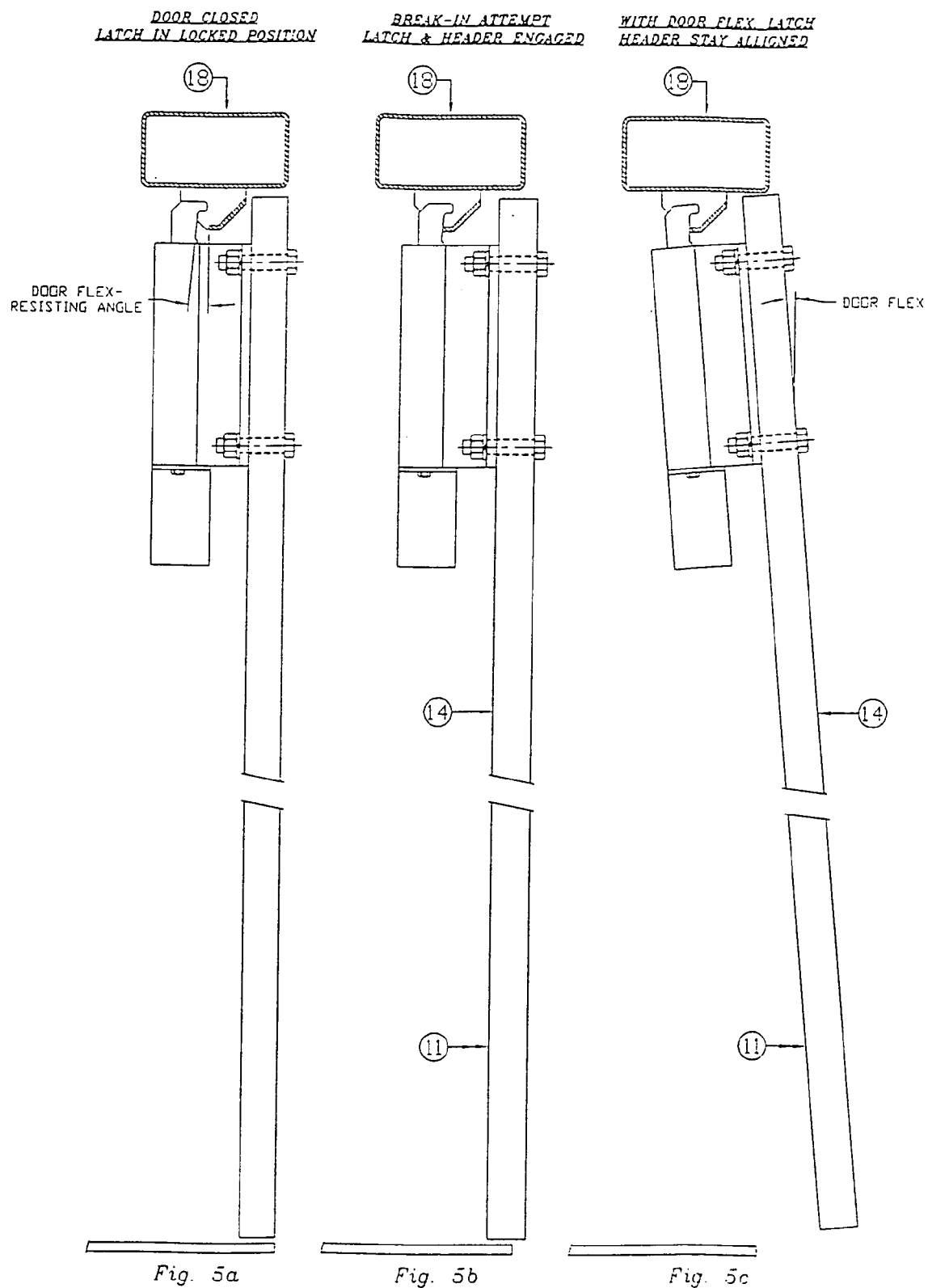

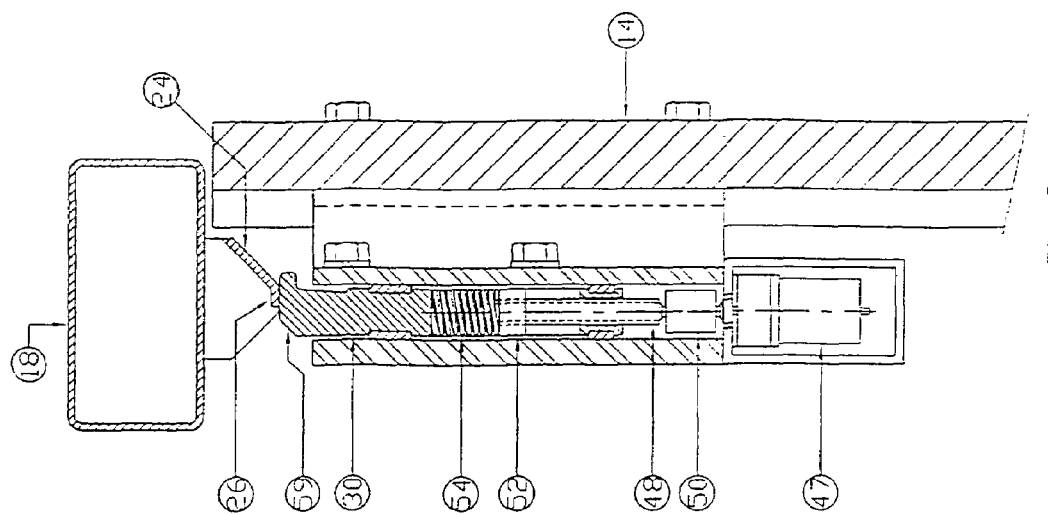
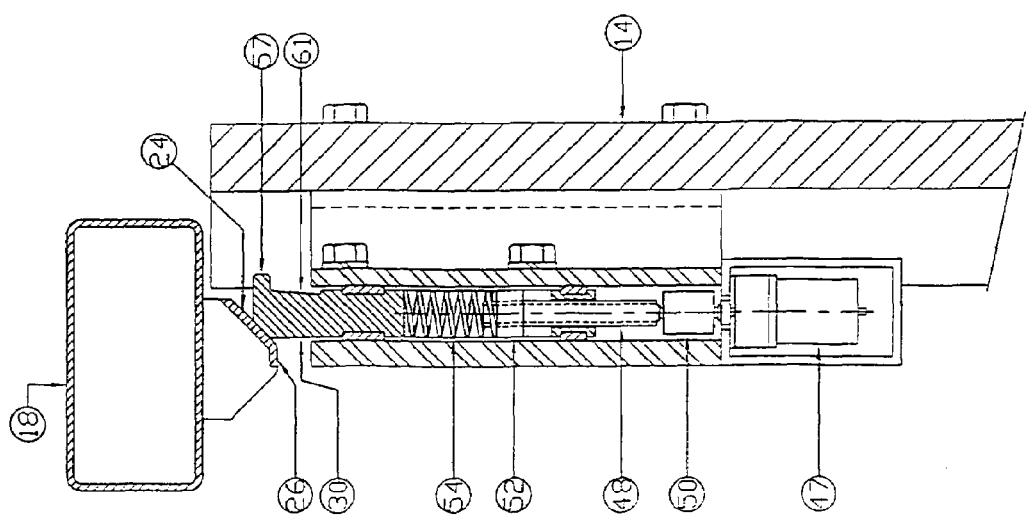

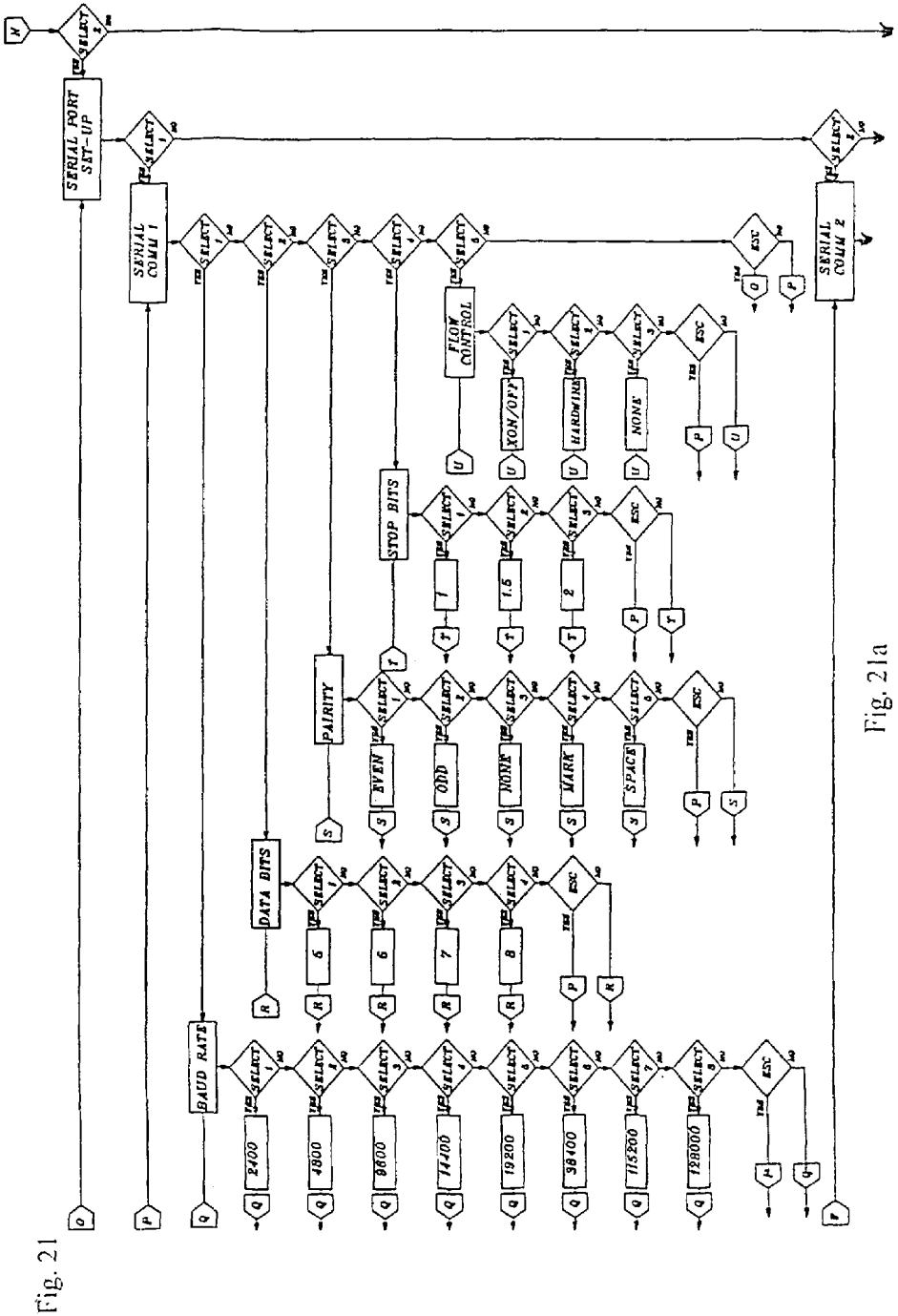

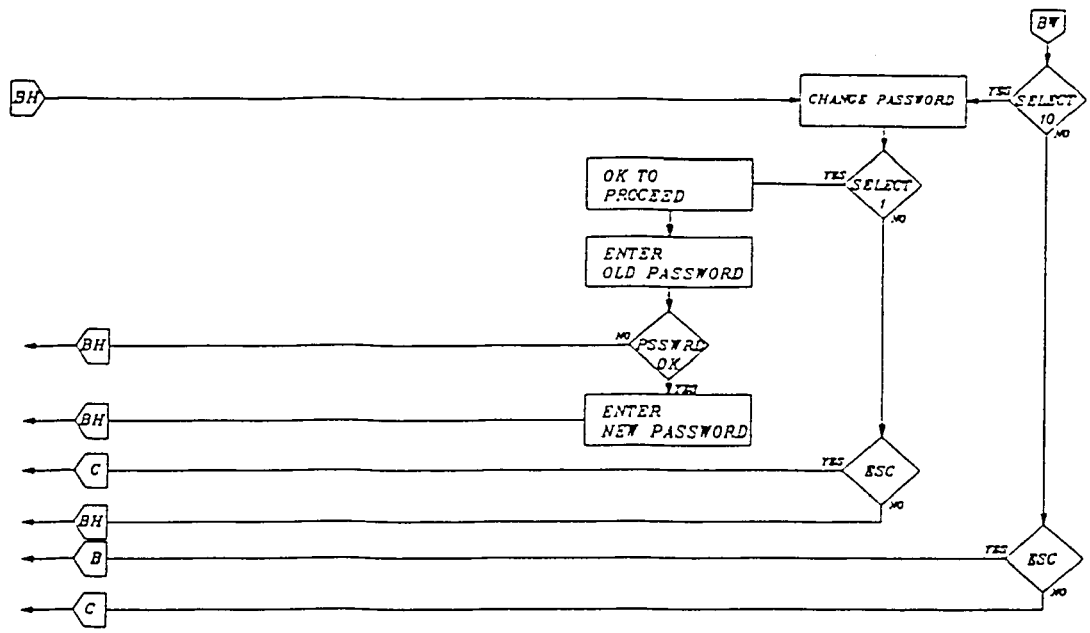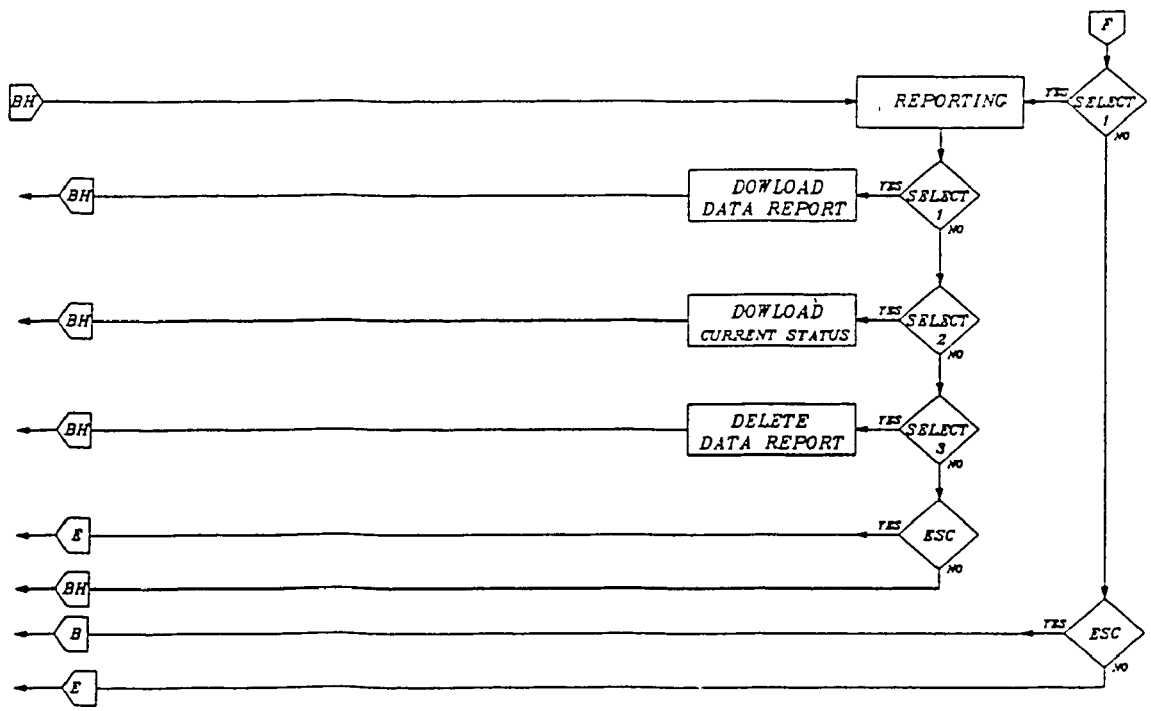
Fig. 29

SECURITY SYSTEM FOR CARGO TRAILERS

BACKGROUND

This invention relates to security systems for containers having doors, and has particular application to apparatus and methods for securing roll-down and/or swing-open doors for cargo trailers.

Containers, such as cargo containers, trailers, delivery vans, storage facilities, and cargo trailers, are often constructed with a door that is accessible from the exterior of the container. For example, sometimes a cargo container has a roll-down door. These roll-down doors often have a latching mechanism on the outside of the door that can be opened easily without a key. Other cargo containers often have a pair of swing-out doors. Such swing-out doors also have latches on the outside of the doors that can be easily opened without a key. The latches on both types of doors are often designed to be lockable using a padlock-type lock.

However, the padlocks used with either type of door can be easily defeated by thieves. For example, some padlocks can be pried open using a screwdriver or pry bar as a lever. Other padlocks can be cut by using bolt cutters or a hacksaw. In any event, an accessible padlock is often not very secure.

Other security systems have been designed for one, or the other, of these two types of doors. While it may be possible to use a similar lock on both types of doors, often a lock designed for one type of door cannot be used on the other type of door. In other cases, such lock would require substantial modification to be used on the other type of door. Often, the designs of such systems are relatively bulky and they extend into the cargo area creating an unusable zone of space. An example of such security systems for either roll-down doors or swing-out doors are shown in U.S. Pat. No. 6,047,576. While such security systems are adequate for some uses, they are not designed to be easily interchangeable for use in both roll-down doors and swing-out doors.

A need exists for a security system that can be used for both roll-down doors and swing-out doors, such as one including a lock with a multi-directional latch. A need also exists for a security system that stores an information record, such as a record concerning the unlocking and/or opening of the door, such as the date, time and/or geographical location of such unlocking and/or such opening. Furthermore, a need exists for a lock for a container having one or more doors that allows the door to be slammed closed and locked when the lock's latch is in a locked position prior to the door being slammed closed. A need further exists for a lock for a container that can be selectively programmed to enable a subset of available features, such as an automatic locking feature.

SUMMARY

The disclosed apparatus and methods avoid some of the disadvantages of prior devices and methods while affording additional structural and operating advantages. In one embodiment of the invention, a method is provided for securing the cargo of a trailer having a container and cargo door accessible from the outside for closing the container and being movable from an open position to a closed position. The method comprises providing a latching device on the inside of the container. The latching device has a latch, a screw for moving the latch between an unlocked position and a locked position, and a rotary motor for turning the screw. A latch receiving device is provided, and is adapted to receive the latch, on the inside of the container. The motor may be operated to turn the screw in one direction, thereby moving the latch from the unlocked position to the locked position. The motor may be operated to turn the screw in the direction opposite of the one direction, thereby moving the latch from a locked position to the unlocked position. In one embodiment, in order to prevent back rotation, the screw has a small degree of pitch. For example, the screw can a degree of pitch no greater than five degrees and the motor has a high gear ratio to prevent back rotation of the screw. In one embodiment, the latch can have an end receivable by the latch receiving device, with the latch including a plurality of locking flanges adjacent the end, with at least two locking flanges projecting out in different directions.

In one embodiment of the invention, the method comprises providing a controller that controls the movement of the latch between the unlocked position to the locked position. A signal generation device is provided which is capable of sending signals to the controller. A memory is provided that is coupled to the controller. A control signal is sent, selected from a lock control signal and an unlock control signal, from the signal generation device to the controller. The unlock control signal indicates that the latch should be in the unlocked position and the lock control signal indicates that the latch should be in the locked position. In one embodiment, the method also includes storing, in memory, control data indicative of the most recent control signal sent from the signal generation device to the controller.

In one embodiment, a latch sensor is coupled to the controller. The method includes sensing, with the latch sensor, whether the latch is in the locked or unlocked position. A latch position signal is sent, indicative of whether the latch is in the locked or the unlocked position, to the controller. One or more door sensors is provided, which can be coupled to the controller. The method includes sensing, with the door sensor, whether the cargo door is in the open or closed position. A door position signal, indicative of whether the door is in the open or closed position, is sent to the controller. The method includes moving the latch from its unlocked position to its locked position. If the signal generation device sends the lock control signal to the controller, the latch position signal indicates that the latch is in the unlocked position, and the door position indicates that the door is in the closed position.

In one embodiment, a memory is coupled to the controller, with the memory being capable of storing control data indicative of the most recent control signal sent from the signal generation device to the controller. A more detailed explanation of the invention is provided in the following description and claims, and is illustrated in the accompanying drawings.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

FIG. 5a is side view in partial section similar to FIG. 2;

FIG. 5b is a view similar to FIG. 5a having a break-in force applied to the door;

FIG. 5c is a view similar to 5b showing the movement of the door when a large break-in force is applied;

FIG. 8 is a view similar to FIG. 6, with the latch engaging the latch receiving device;

FIG. 9 is a view similar to FIG. 8, with the bolt engaging along the bottom portion of the latch receiving device;

FIGS. 19–31 is a flow chart for one example of a program for configuring the lock, providing report information, and creating a maintenance reminder schedule.

DETAILED DESCRIPTION

Figures 1, 2, 3:
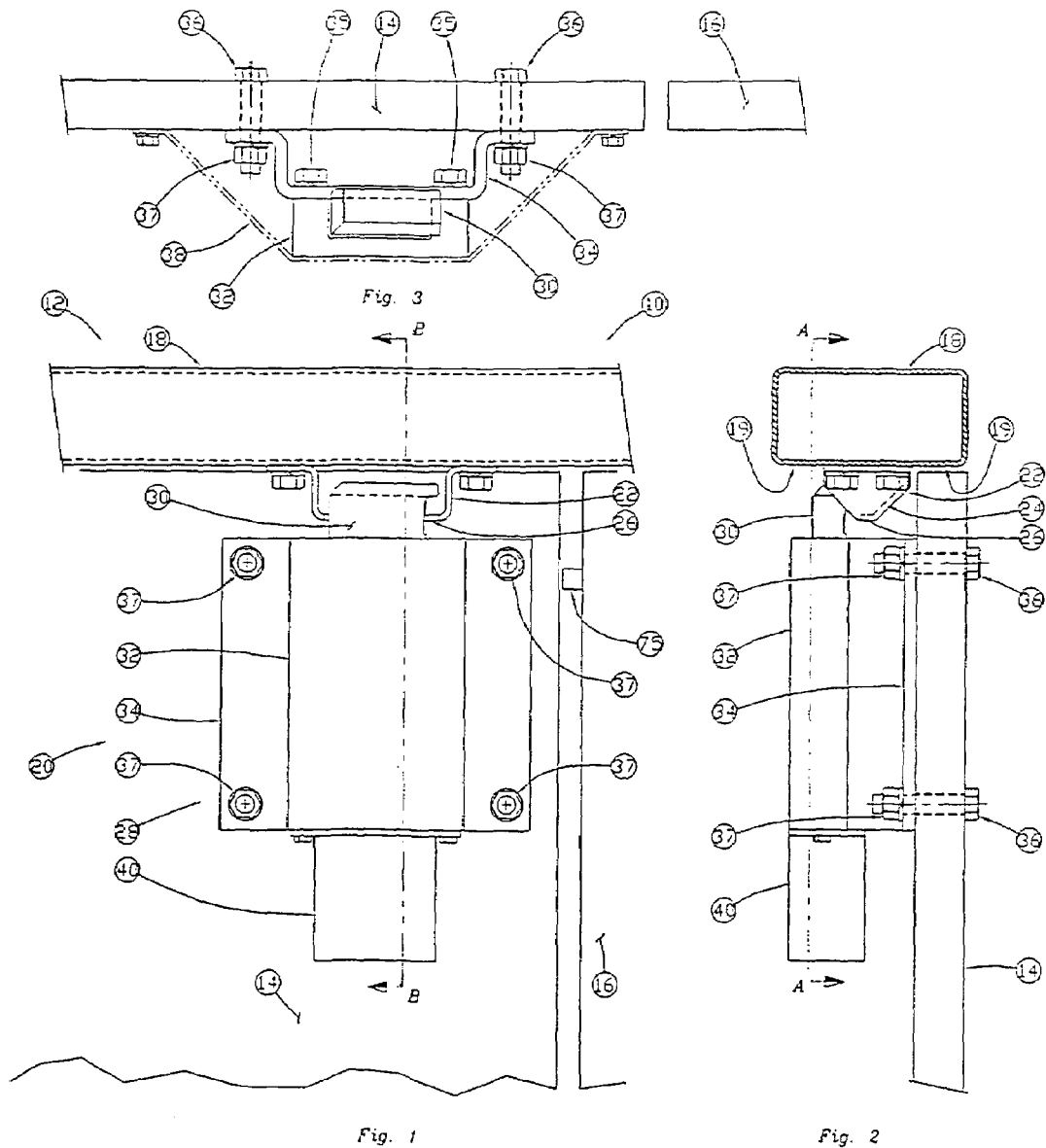
FIG. 1 is a fragmentary, front view of the inside view of closed swing out doors of a cargo container with the locking device in the locked position.
FIG. 2 is a fragmentary, internal right-side view of a cargo container having a security system with the locking device in the locked position.
FIG. 3 is an internal top view, with the header removed for clarity, of the interior view of the swing out type door for the cargo container of FIG. 1.

Turning now to the drawings, and, more particularly, FIG. 1 thereof, there is depicted a portion of a cargo transport vehicle 10, that can be used in (or may comprise) a truck, train, ship, or airplane. Cargo transport vehicle 10 includes a container having doors, such as cargo trailer 12 (shown in partial section), having doors 14 and 16. In one form, doors 14 and 16 are of the swing-out variety. Similar swing-out doors are shown in U.S. Pat. Nos. 6,047,576; 5,931,033; and 5,806,355. Cargo trailer 12 typically includes a header 18, which acts as a frame that provides strength and rigidity to the cargo trailer 12.

A locking device 20 is provided in cargo trailer 12 and can include latch receiving device 22. In one form, latch receiving device 22 is bolted or otherwise attached to the underside 19 of container header 18. Latch receiving device 22 can be located very near to, or right against, door 14 when door 14 is in the closed position, as shown in FIG. 2. Latch receiving device 22 is compact to minimize the amount of space it extends away from the closed door in order to minimize the unusable zone of space in cargo trailer 12. In one form, latch receiving device 22 extends less than 5 inches from closed door 14 or can extend less than 4 inches, 3 inches or even 2 inches from the closed door 14. Good results have been achieved when latch receiving device 22 extends about 2⅞ inches and even as little as about 1½ inches from closed door 14.

As shown in FIG. 2, latch receiving device 22 can include a downwardly and rearwardly projecting portion 24 that projects downward from header 18 and inward from door 14. This angled portion minimizes damage to cargo if it were to hit latch receiving device 22 as it is loaded into cargo trailer 12. Additionally, latch receiving device 22 is less likely to be knocked off header 18 if it is hit as cargo is loaded into the trailer. A rearwardly projecting lip 26 is coupled to downwardly and rearwardly projecting portion 24 and projects inward from door 14. In one form, rearwardly projecting lip 26 is approximately parallel to the underside 19 of header 18. In a preferred form, the distance that latch receiving device 22 projects downward from header 18 is minimized in order to minimize the unusable zone of space in cargo trailer 12. In one form, latch receiving device 22 can project less than 5 inches, or less than 4 inches, less than 3 inches, less than 2 inches, and even about 1 3/16 inches downward from header 18 when latch receiving device 22 is mounted to header 18.

Locking device 20 includes latching device 28 having a latch 30. Latch 30 can be supported by housing 32. Latch 30 is rigidly attached to door 14, such as by bolting housing 32 to bracket 34 using bolts 35. Similarly, bolting bracket 34 can be attached to door 14 with bolts and nuts 37. Although bolts 35 and 36 are shown, any other appropriate fastener can be used to couple latch 30 to door 14, including screws, welds, adhesives or an appropriate tongue and groove system coupling door 14 and latch 30. However, if bracket 34 is removably coupled to housing 32 (such as with bolts and nuts, screws, or a tongue and groove system), a user can mount brackets to doors on different containers and keep a relatively small inventory of locking devices 20 to be used, as needed, on different containers.

In one form, an angled deflector cover 38 (shown as dashed lines in FIG. 3) can be bolted to door 14 or can be an integral part of housing 32. Angled deflector cover 38 covers latching device 28 to protect it from being damaged from shifting cargo or from being struck during the loading or unloading process. For example, the angled deflector cover 38 can help protect latching device 28 when the swing-out doors are open and swung back along the sidewalls of the container, thus exposing angled deflector cover 38 and latching device 28 to the exterior of the container. If another truck were to hit the exposed angled deflector cover 38 while the doors on the first truck are open (now along the exterior sidewalls of the container) the angled deflector cover would protect the latching device 28 and cause the open doors to flex as the truck moves past.

Figure 4:
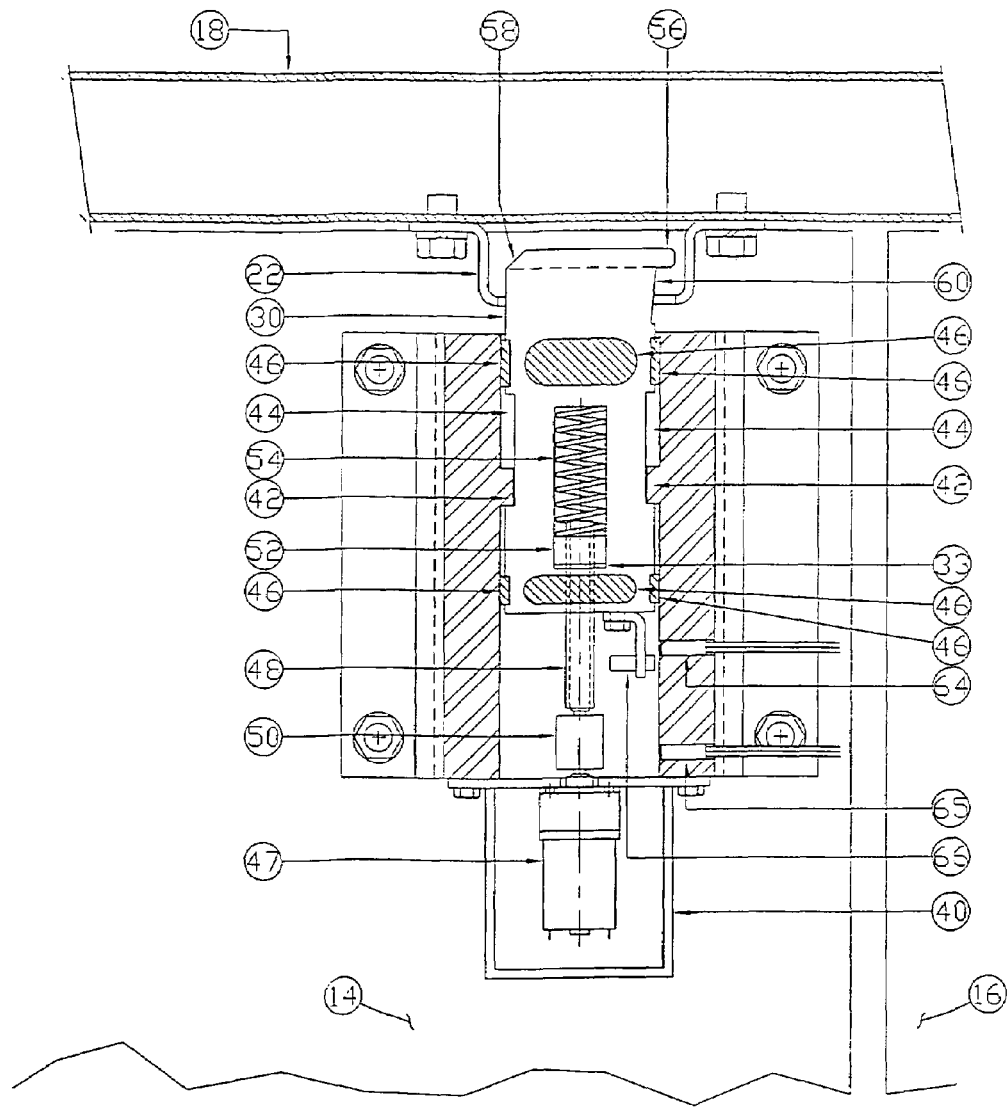
FIG. 4 is an enlarged sectional view taken along the line A—A in FIG. 2.

Referring to FIGS. 4–9, housing 32 and latch 30 cooperate to allow latch 30 to extend and retract from housing 32. In one form, tabs 42 of housing 32 protrude within indentations 44 of latch 30, thereby allowing latch 30 to ride within housing 32 and also limit the amount of travel of latch 30. Such limits on the travel of latch 30 prevents latch 30 from extending too far into housing 32 or too far out of housing 32. This also prevents latch 30 from falling out of housing 32. Additionally, as shown in FIG. 4, the limit on travel of latch 30 can be used to provide a drive line isolation gap 33 that isolates latch 30 from drive nut 52. Drive line isolation gap 33 allows latch 30 to move a certain amount without contacting drive nut 52 and, thereby, without causing a strain on drive screw 48 that would be transmitted to coupling 50 and motor 47. In other words, drive line isolation gap 33 is one way to isolate motor 47 from the forces that are acting on latch 30 when an attempted break-in occurs or as the doors move during transport or when parked on an uneven surface. The creation of drive line isolation gap 33 is explained below.

Figure 37:
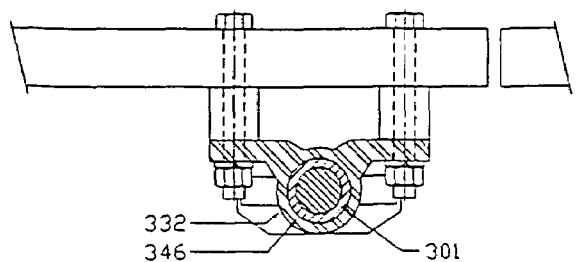
Figure 35:
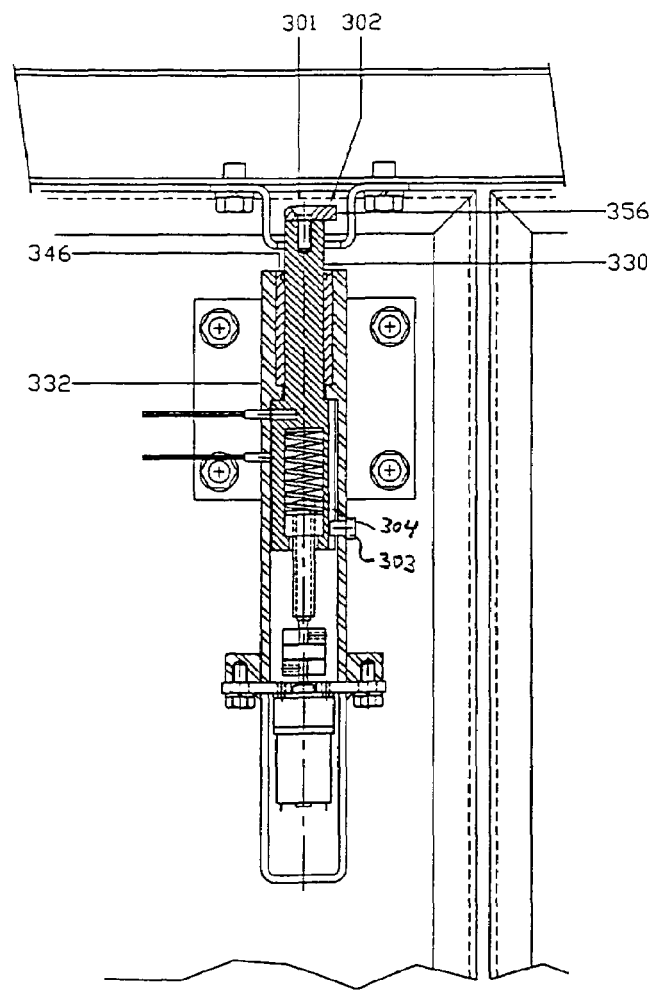
Figure 36:
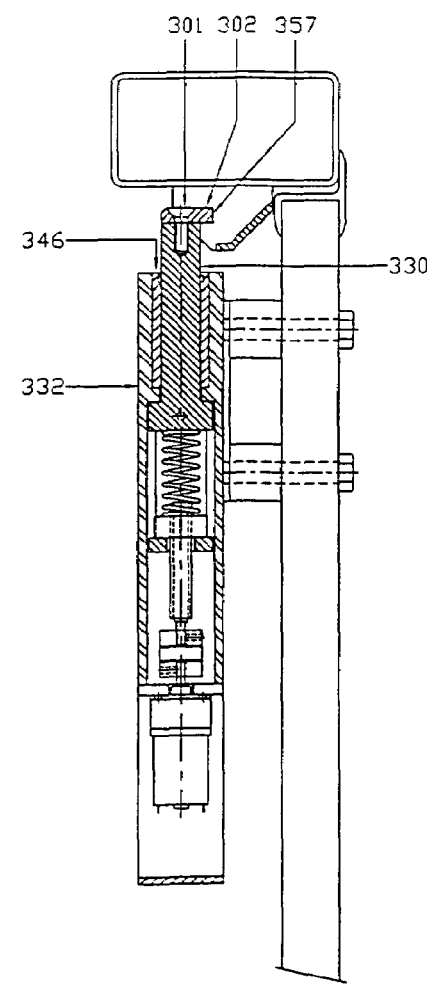

Replaceable wear pads 46 (or bushings 346 in FIGS. 35–37) can be provided to prevent latch 30 and housing 32 from wearing against one another. Replaceable wear pads 46 can be made from any suitable material that preferably has a low coefficient of friction and is resistant to wear. In one form, wear pads 46 (or bushings 346) can be made from an oil impregnated nylon, or other plastic, such as that sold under the trademark Nyloil. Replaceable wear pads 46 (or bushings 346) also prevent corrosion or rust from bonding latch 30 and housing 32 together. Replaceable wear pads 46 (or bushings 346) also prevent interaction between latch 30 and housing 32 that can create problems, especially if dissimilar metals or other materials are used.

A drive, such as a 12 v bidirectional DC gear motor 47, is provided and coupled to a drive screw, through coupling 50, for driving latch 30 into an extended or retracted position. In one form, drive screw 48 has a small degree of pitch, such as 5° or less. This small degree of pitch aids in preventing backdrive due to vibration that can be caused, for example, by movement of a cargo trailer or when someone is trying to break into the doors.

Additionally, motor 47 is more efficient than the solenoid used in other devices. Such solenoids often use 5 to 10 amps to move the latch, whereas the gear motor typically uses less than 5 amps, and may use less than 1 amp of power to move latch 30 to either the locked position or the unlocked position. In one form, gear motor 47 uses less than 200 milliamps to move the latch to either the locked position or unlocked position. Additionally, motor 47 does not require power to keep latch 30 in the locked position, whereas prior solenoid driven devices ordinarily needed to maintain the solenoid energized to keep the latch in place. Other prior solenoid devices attempted to overcome this excess energy usage by using mechanized means to keep the solenoid in place; however such systems required additional power to overcome the mechanized means when the latch was moved.

Drive nut 52 is threaded on drive screw 48. Alternatively, a portion of latch 30 can be threaded appropriately so it mates with drive screw 48 in order to take the place of drive nut 52. A spring, such as coil spring 54, is coupled between drive nut 52 and latch 30. In one form, a hollow portion of latch 30 carries coil spring 54, such that one end of coil spring 54 rests against drive nut 52 and the opposite end presses against a portion of latch 30. This causes a force to be exerted between the threads of drive nut 52 and drive screw 48, thereby increasing the frictional force between them. This also aids in preventing any backdrive, of the drive nut 52 and drive screw 48, due to vibration. Also, the use of spring 54 acts in conjunction with drive nut 52 (which is not secured to latch 30) and drive line isolation gap 33 to isolate forces that are exerted on latch 30, such as those that occur during an attempted break-in, from being transmitted to drive screw 48 and thus to coupling 50 and motor 47. In other words, spring 54 is a second way to isolate motor 47 from the forces that are acting on latch 30.

In one form, latch 30 is a universal latch or a bidirectional latch that can be used to lock the door without the latch having to face in only one of a multiple of possible directions. In other words, the latch works when facing one of at least two different directions. In another form, latch 30 could be a universal latch that can be rotated in housing 32 to face an appropriate direction to allow the same locking system to be used on different types of doors. In either case, the universal latch allows the latching device to be used in more than one orientation.

Figure 5:
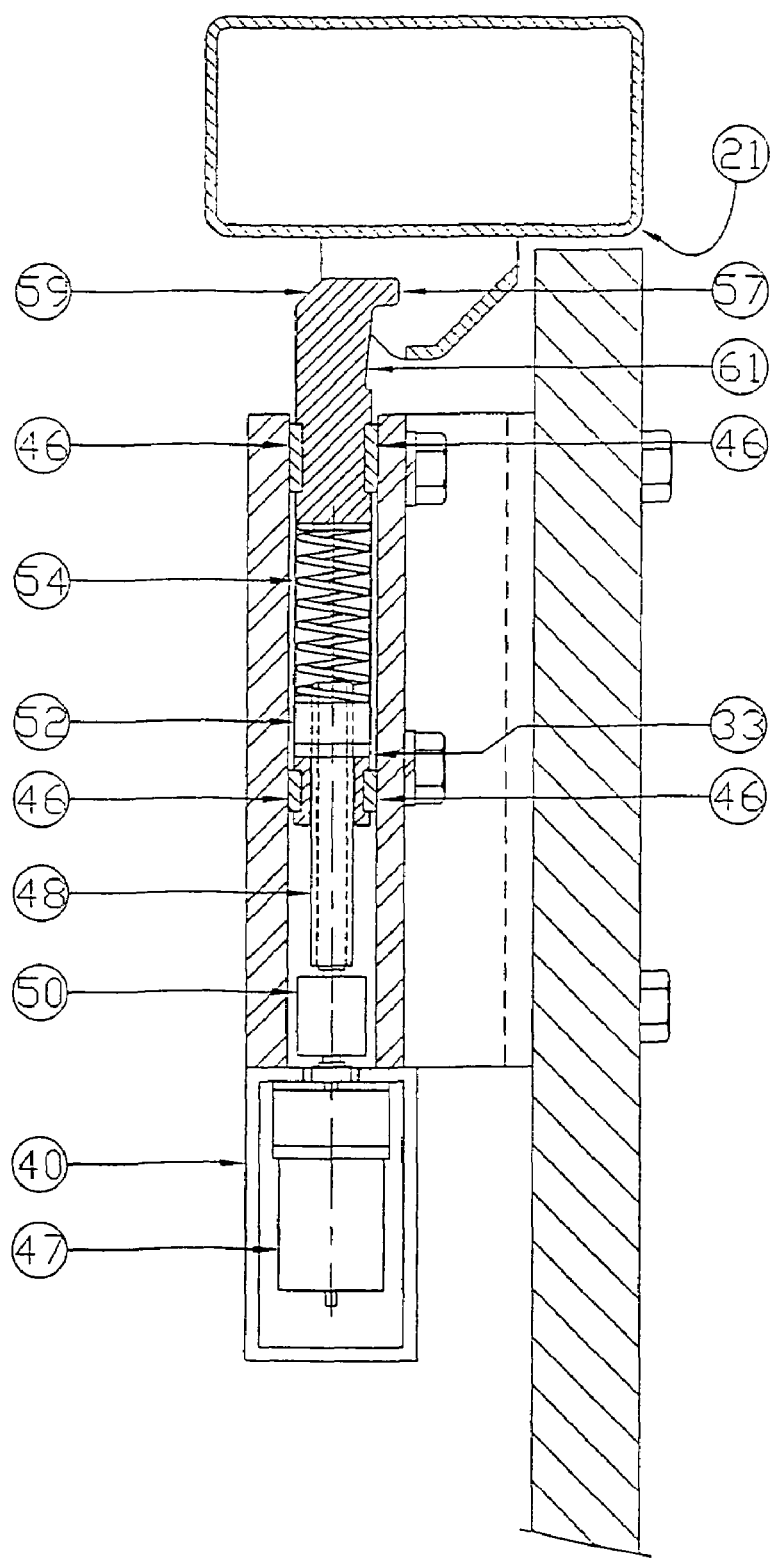
FIG. 5 is an enlarged sectional view taken along the line B—B in FIG. 1.

For example, as shown in FIGS. 4 and 5, latch 30 includes locking flanges 56 and 57 that extend outward from the body of latch 30 at approximately a 90° angle. Flanges 56 and 57 also extend outward from latch 30 in directions that are approximately 90° from one another. These locking flanges 56 and 57 can act to capture latch receiving device 22 to prevent latch 30 from moving past latch receiving device 22 when the doors move, such as when they rack while in transit or when parked over uneven terrain. The racking of the doors causes the gap between the door and the header to increase or decrease by roughly ¾ inch. When the doors rack and the gap between the door and header increases a certain amount, locking flanges 56 or 57 contact lip 26 and prevent latch 30 from passing under latch receiving device 22. In one form, locking flanges 56 and 57 mirror or are at a complementary angle to lip 26 to aid in preventing latch 30 from passing under latch receiving device 22.

Latch 30 can include one or more latch engaging surfaces 58 and 59. In one form, latching engaging surfaces 58 and 59 are at a complementary angle to downwardly and rearwardly projecting portion 24 of latch receiving device 22. Latch 30 can also include a small cut-out portion 60 and 61 beneath latch engaging surfaces 58 and 59. Cut-out portions 60 and 61 can be angled slightly, such that cut-out portions 60 and 61 are shallower at a portion nearer locking flanges 56 and 57 compared to a portion that is further from locking flanges 56 and 57. Although cut-out portions 60 and 61 are referred to as being cut out, they can be formed in any appropriate manner and do not require that material specifically be removed. Similarly, cut-out portions 60 and 61 could have a curve as its profile, instead of the straight angled line shown in FIGS. 4 and 5.

The combination of locking flange 56 (or 57) and cut out portions 60 (or 61) allows for increased flexibility of installation and a more robust design. The spring 54 and the latch 30 also allow for increased flexibility of installation and a more robust design because spring 54 can compress and allow latch 30 to move when contacted by header 18, or another part of cargo trailer 12, when the doors rack and the gap between the door and the header decreases.

Figure 13:
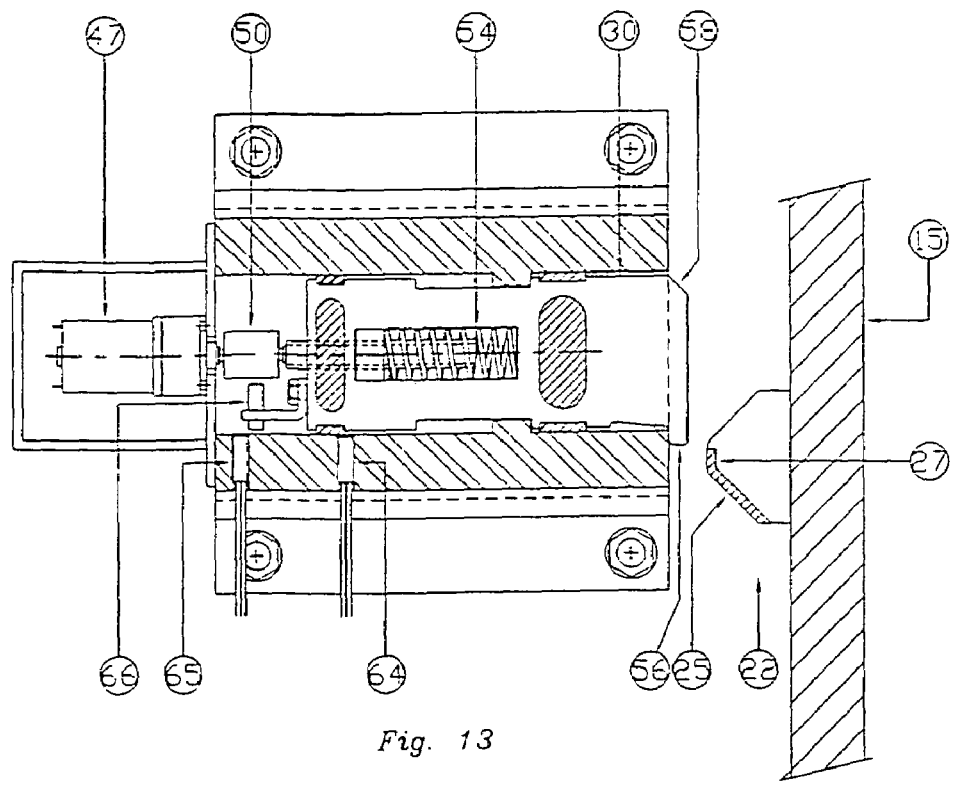
FIG. 13 is a partial sectional view taken along lines A—A of the cargo container of FIG. 11, with the door in a partially open position and the latch in the unlocked position.

One or more sensors, such as optical sensors, mechanical switches or reed switches 64 and 65 (FIG. 13) can be provided in housing 32 to sense when latch 30 has moved to a locked or unlocked position. In one form, an actuator 66 is coupled to latch 30 and moves so that it comes in contact with or proximity to switches 64 and 65 so that the movement of actuator 66, and the latch 30, can be sensed. Alternatively, reed switches 64 and 65 could sense the movement of a particular portion of latch 30. In one form, a single sensor could be used to sense when latch 30 is in one of the locked and unlocked positions. If it is not in the one position, then it could be assumed that latch 30 is in the other position.

When in use on a swing-out type door, such as doors 14 and 16, latch receiving device 22 is attached to the header or another portion of the ceiling of the cargo transport vehicle 10. Alternatively, a portion of header 18 can be cut out with the remainder replacing the latch. In other words, latch 30 would extend into the opening in header 18 to be in the locked position and clear the opening in the unlocked position.

Figure 6:
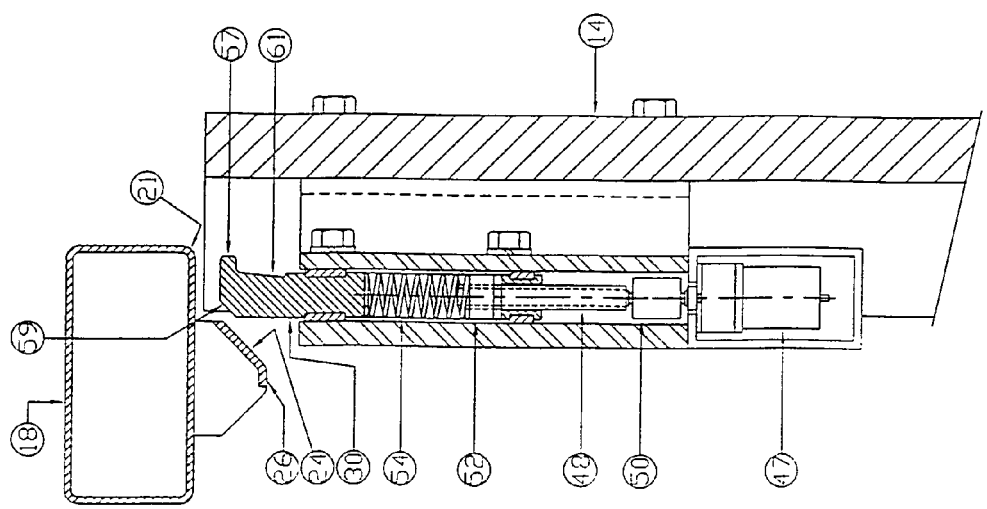
FIG. 6 is a view similar to FIG. 5, with the door partially open and the locking device in a locked position.
Figure 11:
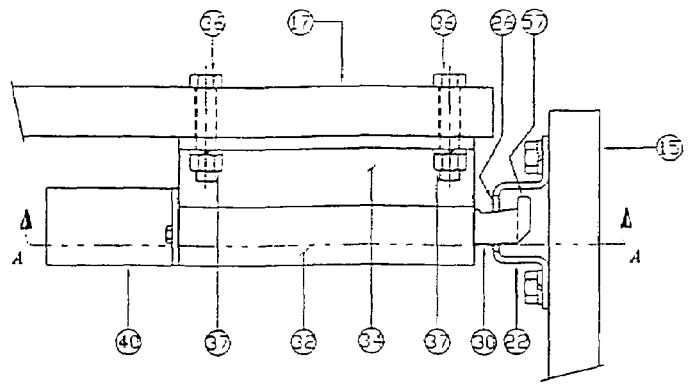
FIG. 11 is a top view of the cargo container of FIG. 10.
Figure 10:
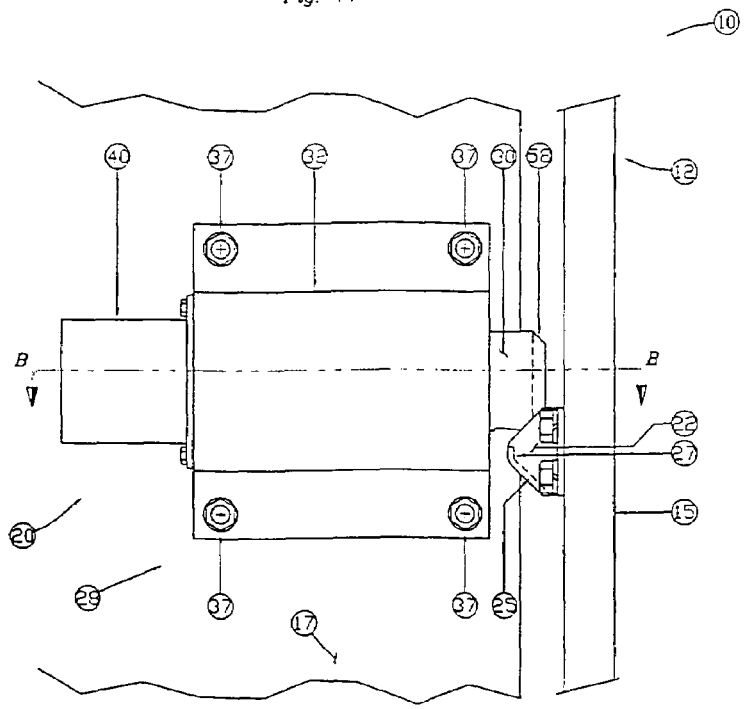
FIG. 10 is a partial, cut-away, front view of the internal portion of a roll up door with a locking device on a cargo container with the locking device in the locked position.
Figure 12:
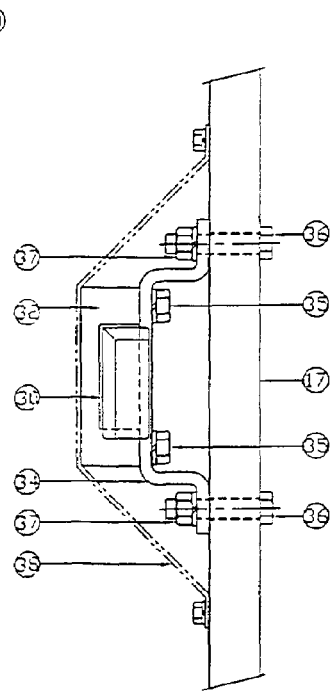
FIG. 12 is a side view, with a portion of the door frame removed for clarity, of the cargo container of FIG. 10.

Latching device 28 is secured to one of doors 14 and 16 such that latch 30 travels in a direction, such as the vertical direction. FIG. 6 shows door 14 open and the latch 30 in the extended or locked position. As door 14 is closed, latch engaging surface 59 contacts downwardly and rearwardly projecting portion 24 (see FIG. 8), such that as the door closes, latch 30 ramps down portion 24, thereby moving downward and compressing spring 54 (see FIGS. 8 and 9). This allows latch 30 to clear the bottom of rearwardly projecting lip 26. When door 14 is fully closed, as shown in FIG. 5, latch 30 clears the end of rearwardly projecting lip 26 and spring 54 forces latch 30 back to the locked position.

Figure 32:
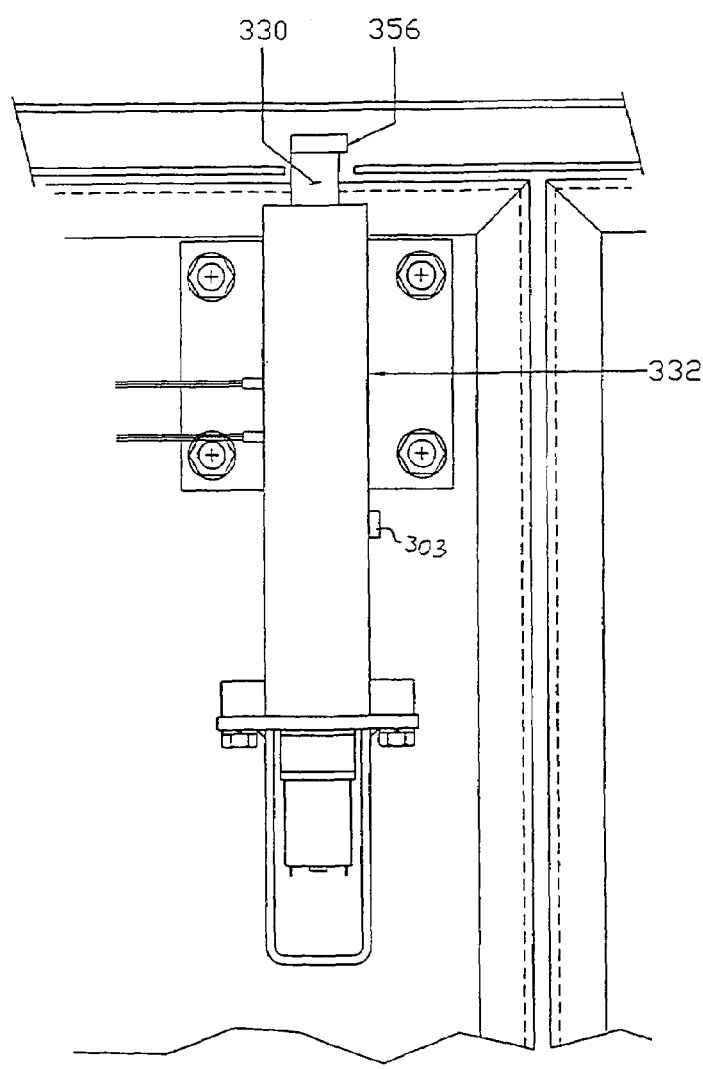
Figure 33:
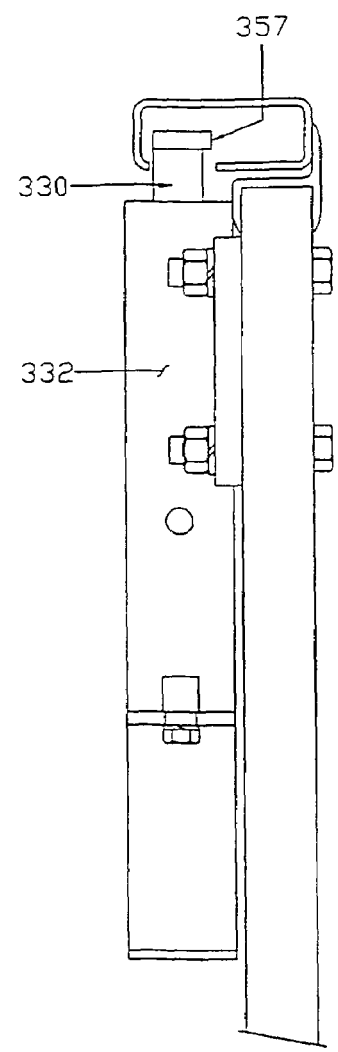

If an opening is made in the header (see FIGS. 32 and 33) to use as a latch receiving device, then the bottom corner 21 of header 18 is the latch engaging device that contacts downwardly and rearwardly projecting portion 24, such that as the door closes, latch 30 ramps down corner 21, thereby moving downward and compressing spring 54. As previously mentioned, latch 30 would then extend into the opening in the header when the door is fully closed.

In one form, cut-out portion 61 is angled to provide an engaging slope which counters the door flex experienced during a break-in. This angle provides less clearance between latch receiving device 22 and latch 30 for a portion that is nearer locking flange 57. As seen in FIGS. 5a–5c, as force 11 is applied to the bottom of door 14, the bottom of door 14 moves outward (in the direction of an open position) cut-out portion 61 contacts lip 26 (see FIG. 5b). As bottom 14 moves further outward, the angle of door 14 changes with respect to header 18 and the cut-out portion 61 moves such that it comes closer to parallel with the face of lip 26 that it contacts. In other words, cut-out portion 61 is angled away from the direction of movement of the door during an attempted break-in, such that cut-out portion 61 is in a relatively vertical plane when door 14 has flexed a normal amount during a break-in attempt.

Figure 7:
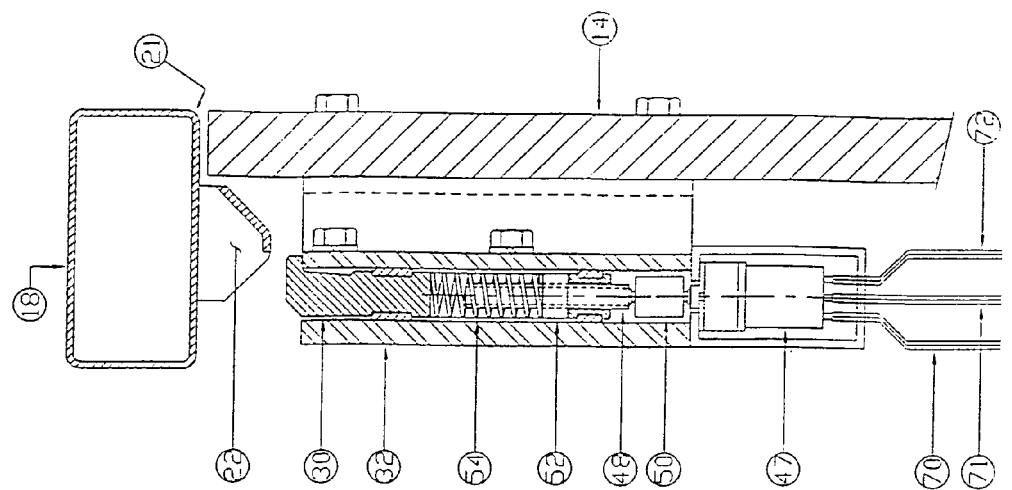
FIG. 7 is a view similar to FIG. 5, with the locking device is in the unlocked position.

To unlock the device, motor 47 drives coupling 50 and drive screw 48, thus causing drive nut 52 to run down the length of drive screw 48. As shown in FIG. 7, since latch 30 is secured to drive screw 48, latch 30 follows drive screw 48 downward and retracts within housing 32 until it clears latch receiving device 22 and is in the unlocked position. Reed switches 64 and 65 are used to determine when latch 30 is in the unlocked position and power can be cut to motor 47.

In order to move latch 30 to the locked position, drive motor 47 and drive screw 48 reverse direction and cause drive nut 52 and latch 30 to travel upward so that latch 30 extends from housing 32 until it is in the locked position, as shown in FIGS. 5 and 6 and indicate when power should be cut to motor 47. In one form, when reed switches 64 and 65 sense that latch 30 is in the locked position approximately when tabs 42 and indentations 44 prevent latch 30 from traveling any farther out of housing 32. Motor can continue running for a short period after tabs 42 and indentations 44 prevent latch 30 from traveling any further out of housing 32 in order to move drive nut 52 slightly farther along drive screw 48, thereby creating gap 33 between drive nut 52 and latch 30. As described above, gap 33 helps prevent forces that are acting on latch 30 from being transmitted to motor 47 and coupling 50.

The term "locked position" denotes any position where latch 30 will prevent the door from opening if latch receiving device 22 was between the door and latch 30, such as shown in FIG. 5. In other words, door 14 does not have to be closed when latch 30 is in the "locked position." Likewise, the "unlocked position" refers to latch 30 being retracted such that it will clear latch receiving device 22 when the doors moved from the closed to the open position.

Referring now to FIGS. 10–16, there is shown the locking device 20 in use with a cargo transport vehicle 10 having a roll-down type door 15. Roll-down type door 15 rolls up to open and down to close. Latch receiving device 22 is mounted to roll-down door 15 such that what was downwardly and inwardly projecting portion is now upwardly and rearwardly (towards the interior) projecting portion 25 and rearwardly projecting lip is now upwardly projecting lip 27. Latching device 28 is mounted to sidewall 17 so that latch 30 retracts and extends in approximately a horizontal direction with respect to the floor of cargo trailer 12.

Figure 14:
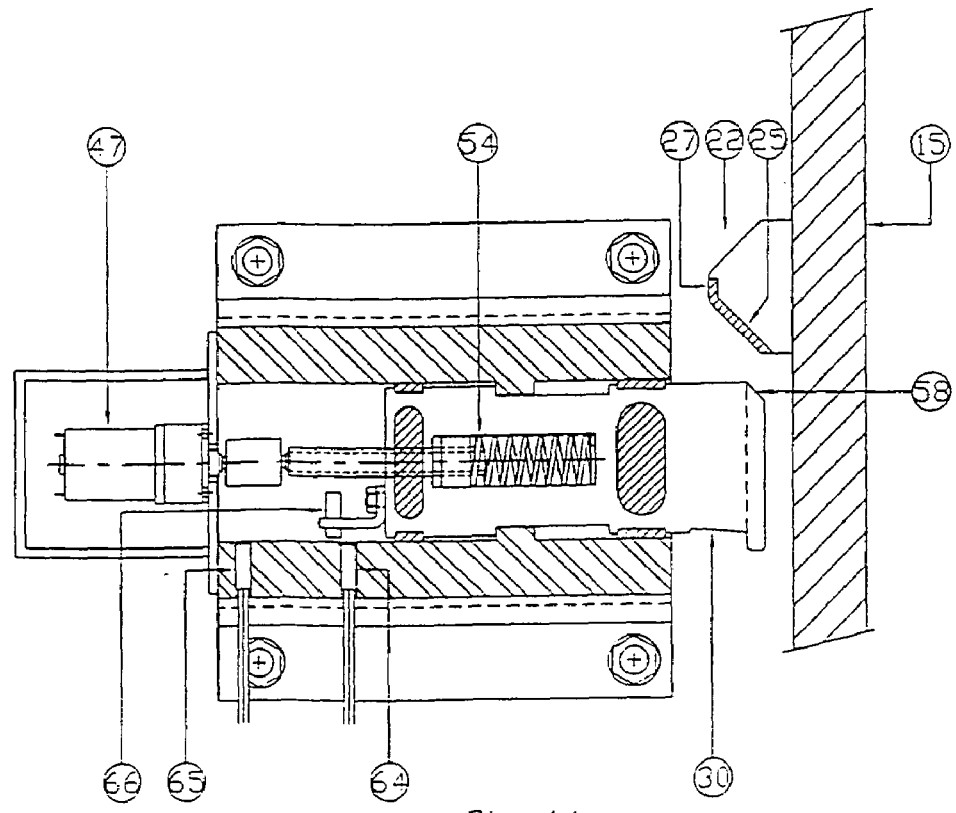
FIG. 14 is a view similar to FIG. 13, with the door in a partially open position and the latch in the locked position.
Figure 15:
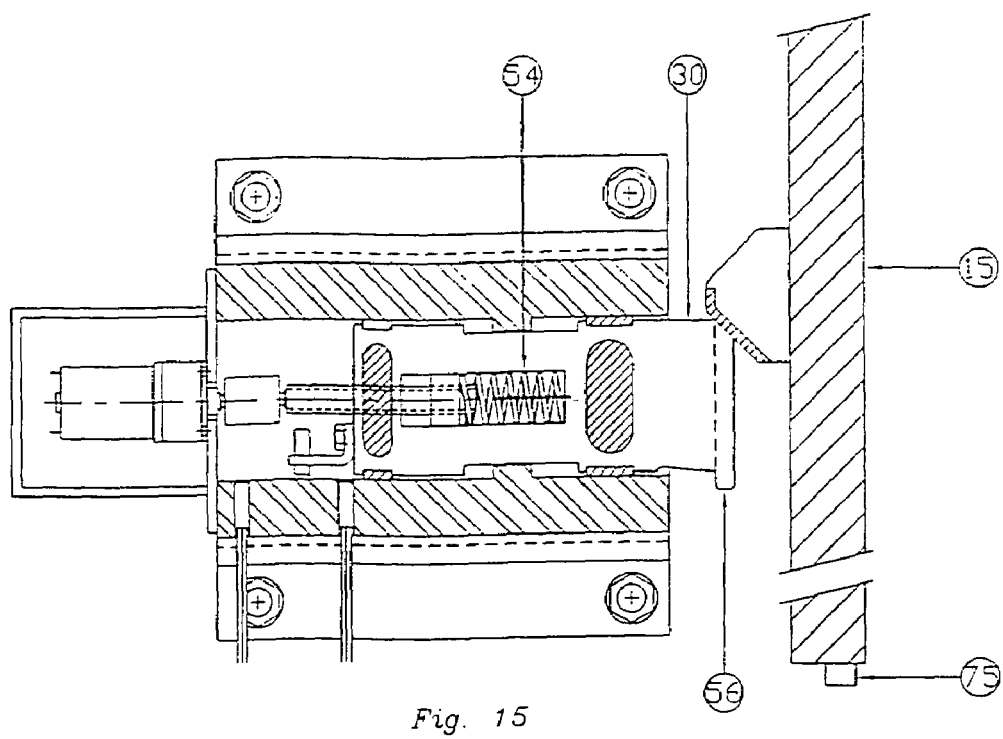
FIG. 15 is a view similar to FIG. 13, with the latch engaging the latch receiving device as the door is pulled down toward the closed position.
Figure 16:
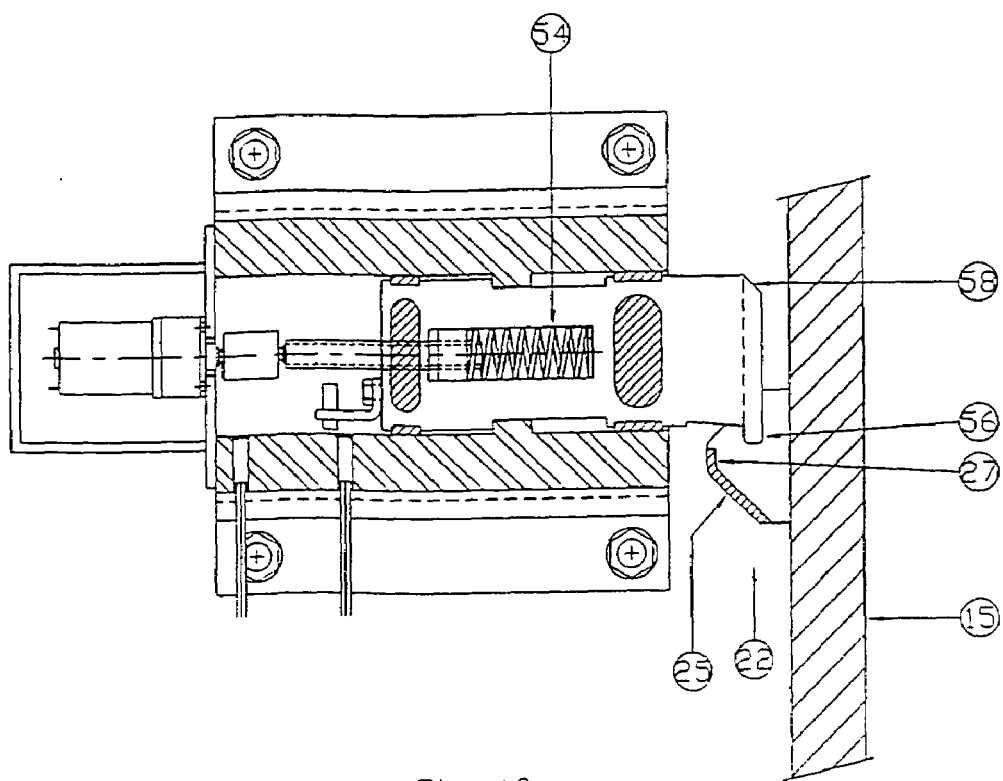
FIG. 16 is a view similar to FIG. 13, with the door pulled closed and the latch in the locked position.

The operation of locking device 20 is similar to what was previously described, with some minor exceptions. FIGS. 14–16 show the operation of roll-down door 15 being pulled down to the closed position with latch 30 extended or in the locked position. As roll-down door 15 moves downward, latch engaging surface contacts and engages upwardly and rearwardly projecting portion 25 and slides along such portion and causes latch 30 to be pushed within housing 32. This causes spring 54 to be compressed, as shown in FIG. 15. After latch 30 has cleared latch receiving device 22, the compressed spring 54 exerts a force on latch 30, extending it out of the housing and into the locked position. Here, it is locking flange 56 that prevents latch receiving device 22 and door roll-down 15 from being moved upward past latch 30 when latch 30 is in the locked position. Otherwise, the operation of the motor and movement of latch 30, from the retracted or unlocked to the extended or locked position, is largely the same. However, latch 30 is moved in a direction that has a large horizontal component, as opposed to a large vertical component, because of the orientation of locking device 20.

In one form, spring 54 is precompressed so that it exerts a biasing force against drive nut 52 so that the threads of drive screw 48 and drive nut 52 are forced against one another, which helps prevent drive nut 52 from moving down drive screw 48 due to vibration, such as when traveling. When latch receiving device 22 is used with the swing-out doors, it is preferably placed very close to the door or right against the door and the lock mechanism is very close to the door to prevent taking up excess cargo space. In one form, locking device 20 protrudes less than 4 inches from the door (on swing out type doors) or trailer sidewall (on roll-up/roll-down type doors), and can be less than 3 inches and even as small as 2.6 inches (including bracket 34). In one form, locking device 20 is less than 3 inches and can be less than 2 inches and even less than 1.6 inches, such as 1.56 inches (if bracket 34 is omitted and locking device 20 is attached directly to the trailer sidewall or door). Similarly, latch receiving device 22 is also a low profile device and can extend no more than as little as 1⅞ inches from the roof or header (on swing-out type doors) or door (on roll-up/roll-down type doors). In one form, an angled deflector cover 38 (shown as dashed lines in FIG. 12) can be bolted to sidewall 17 or can be an integral part of housing 32. Angled deflector cover 38 covers latching device 28 to protect it from being damaged from a loading truck or shifting cargo or from being struck during the loading or unloading process.

As shown in FIGS. 1, 2 and 4–9, latch receiving device 22 can be located on header 18 right up against the door when the door is in the closed position. Because of the motor and screw drive, the placement of locking device 20 is more robust since the screw allows for a flexible stroke configuration, thereby allowing less exact placement of locking device 20. Motor 47 and the drive system can be a linear system containing a linear motor, a direct drive system, or other system that does not use gears between motor 47 and latch 30. The linear system enables optimum power transfer. In the system described here, coupling 50 is a flexible coupling between the motor and the screw and reduces vibration from being passed to the motor from latch 30. It should also be noted that if latch receiving device 22 were not used on the swing-open type door and instead was replaced with an opening in header 18 (see FIGS. 32 and 33), latch engaging surface 59 would engage the corner of the header adapter and still force latch 30 downward as the door is closing. In one form, motor 47 can have a high gear ratio, such as 15, 20, 25, 30, 40 or 50 to 1 to make it more difficult for the drive screw 48 to turn, due to vibrations during movement of cargo trailer 12 or otherwise, and cause latch 30 to move to the unlocked position. In one form, the gear ratio is 43:1. The gear ratio is important because it allows the lock to open relatively quickly, makes a more efficient use of power. Additionally, it is preferred if the gear ratio is high enough to break ice that may form between latch 30 and latch receiving device 22.

It should be noted that the disclosed locking device can have three levels of security. First, latch 30 is extended so that it interferes with latch receiving device 22. Second, either locking flange 56 or 57 prevents latch 30 from moving past latch receiving device 22 as the cargo doors shifts, such as when parked on an angle while traveling down the road, or during an attempt to break into the cargo trailer. Third, tabs 42 and indentations 44 prevent latch 30 from being pulled completely out of housing 32.

In one form, the diameter of drive screw 48 is selected with respect to the pitch to allow faster travel. The greater of the diameter for the same pitch, the faster the screw travels with the same rpm. For example, the diameter of the screw is less than ¾ of an inch and can be less than ½ inch, less than ⅜ of an inch, less than ¼ of an inch and can even be ⅛ of an inch or less in thickness. Additionally, the drive screw 48 allows for a more robust design and requires less tolerances for attaching latching device 28 on the door. This is because motor 47 can be controlled to rotate drive screw 48 by different number of rotations to adjust how much latch 30 extends out of housing 32. Latch 30 and housing 32 can contain holes for weight reduction and/or to provide drainage. In one form, such as one having a rounded latch 330 in FIGS. 34–37, an o-ring seal can be provided between housing 332 and latch 330 (or bearing 346 and latch 330 and/or bearing 346 and housing 332) to help minimize moisture penetration into housing.

Although locking device 20 is shown mounted to a door and header for the swing-out doors, it could be mounted across both doors such that latch receiving device 22 is mounted on one door, latching device 28 is mounted on the other door and latch 30 moves in approximately horizontal direction to move between an unlocked position and a locked position. Alternatively, latching device 28 can be mounted on the door near the floor (in either a swing-out or roll-up/roll-down type doors) and an opening can be made in the floor to be used as a latch receiving device. Because of the force placed on a door during attempted break-ins, a steel door can have the locking device installed at the top without much of a problem, whereas a semi-thick door might have the lock placed at the middle of the door height and a thin door might have the locking device installed near the bottom of the door. However, due to possible load shifts, it is preferred to mount the lock at the top or bottom because it might bind at the center.

Referring to FIGS. 32–37, an alternate form of locking device 20 is shown. The construction and operation is largely the same as previously described. However, in this form, latch 330 is mostly cylindrical in form and has a circular cross-sectional area. Similarly, housing 332 can take the form of a hollowed cylinder also having a circular cross-sectional area. Wear pads can be made from bushings 346 that are also in the form of a hollowed cylinder having a circular cross-sectional area. In one form, locking flanges 356 and 357 are formed as a separate part, such as flange portion 302, and coupled to latch 330 by any appropriate method, such as screw 301 threaded into a threaded opening (not shown) in latch 330. Having latch 330, housing 332 and bushing 346 as round cylindrical pieces makes them easier to manufacture and decreases manufacturing costs. Additionally, having the flange portion 302 comprising locking flanges 356 and 357 separate from the rest of latch 330 allows the flange portion 302 to be rotated to the appropriate position and secured in the field so that flanges 356 and 357 point in the desired direction.

Figure 17:
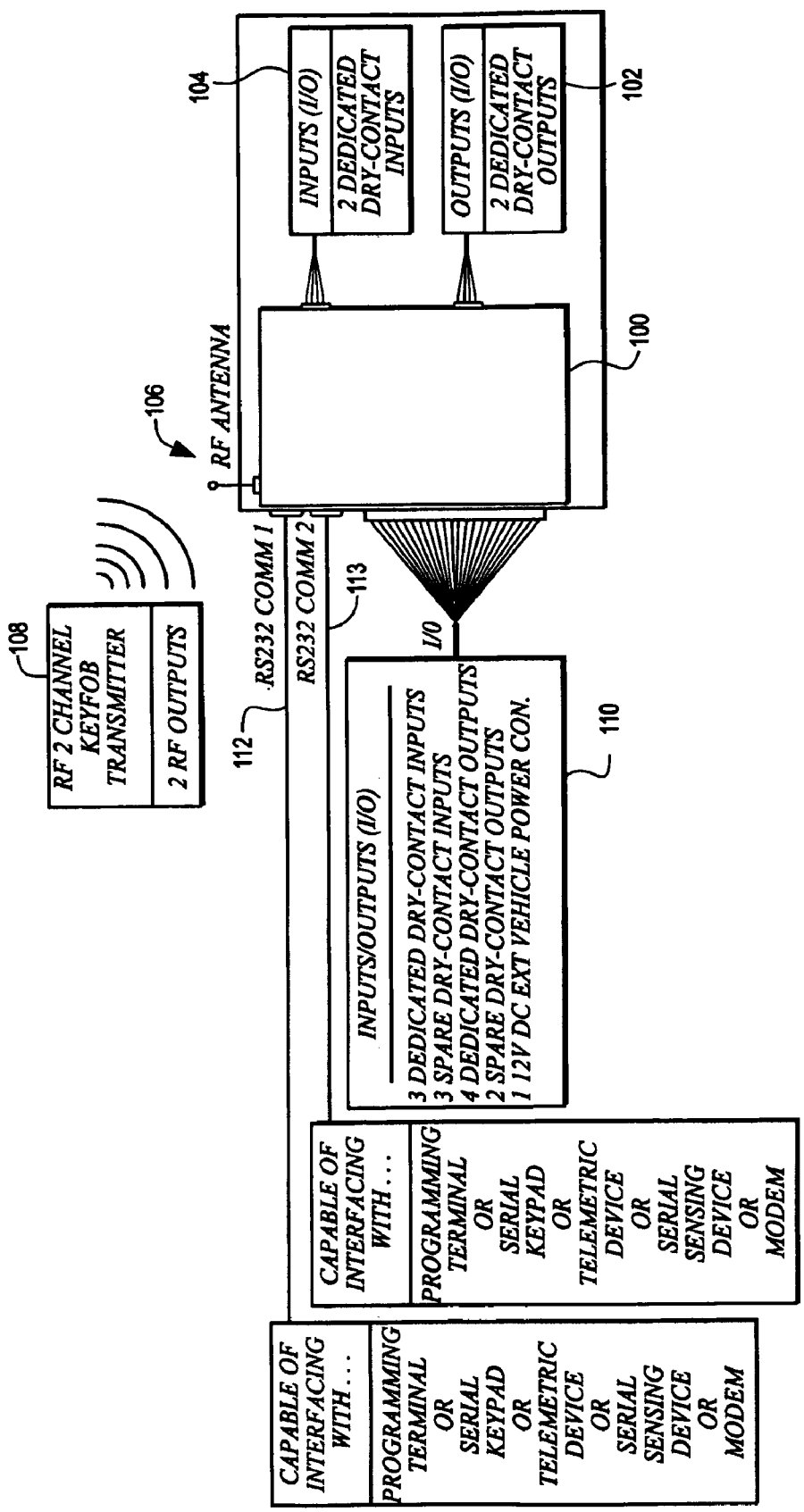
FIG. 17 is a schematic diagram of an Electronic Control Unit that can be used with the disclosed devices.
Figure 17A:
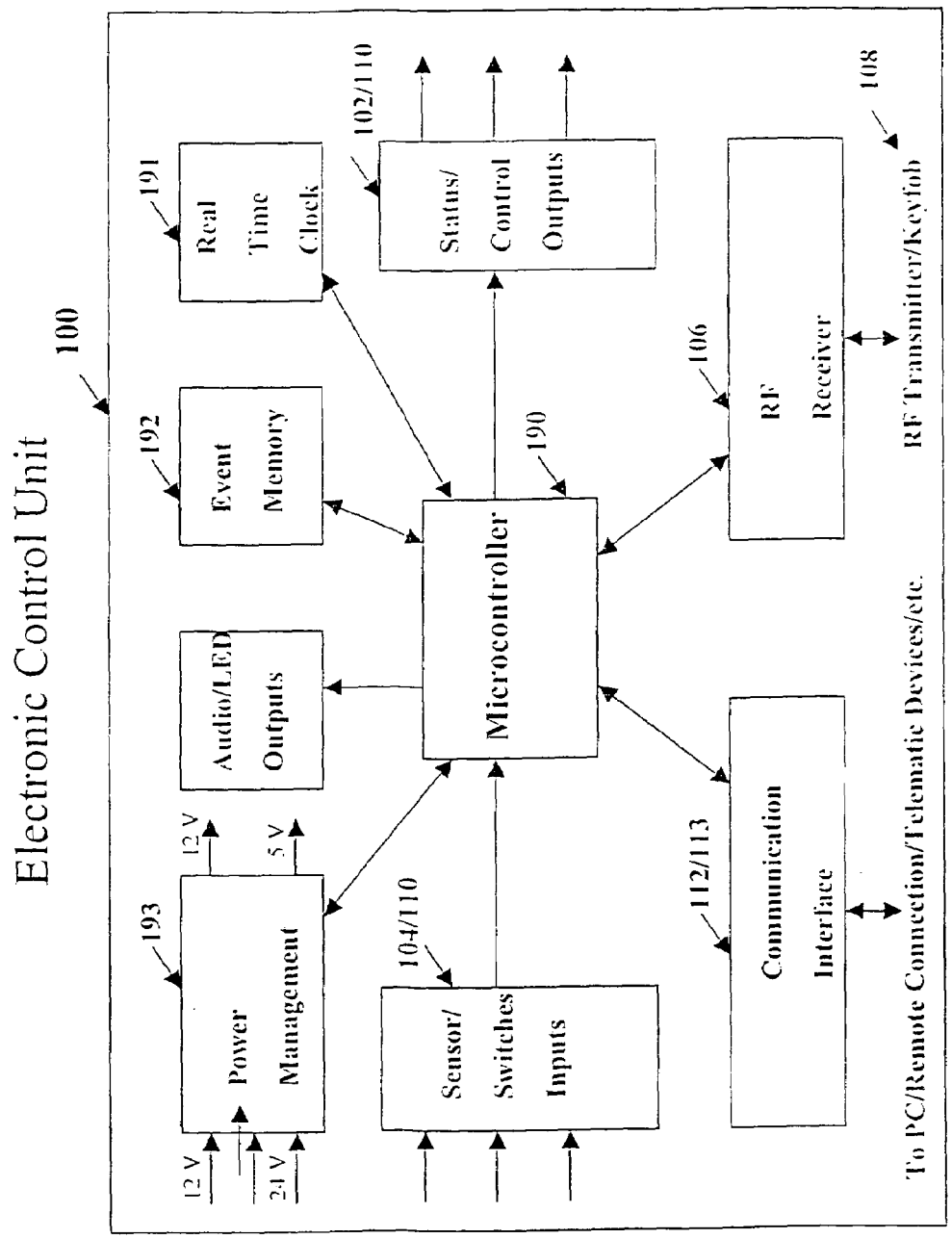
FIG. 17a is a schematic diagram showing subcomponents of one form of the Electronic Control Unit of FIG. 17.

In one form, locking device 20 includes a controller, such as Electronic Control Unit (ECU) 100 (FIGS. 17 and 17a). ECU 100 controls locking device 20 as a stand alone lock or as a device that can be coupled with telematic (GPS, cellular, GLS, wireless networks, etc) or RF systems to provide a security system that logs various events, including the location of the event. ECU 100 can be supported by housing 32, such as by being mounted inside housing 32 near motor 47 or mounted within motor housing 40. In another embodiment, the ECU 100 can be self-contained and connected to motor 47 via adjustable wiring harness.

ECU 100 can be comprised of microcontroller 190 that may include an internal memory (not shown) or that has a memory coupled to it. A real time clock 191 can be coupled to allow the timing of various events to be recorded in a event memory 192 coupled to microcontroller 190. Such events can include opening or closing the door, the latch moving to either an unlocked position or a locked position, the door being in a locked condition or an unlocked condition, an attempted break-in, problems or errors in the execution of commands or in the status sensed after a command (discussed later). In one form, event memory 192 can record the time, location, and individual (or keyfob) associated with a particular event. Event memory 192 can be designed to make it difficult to erase and can be set up to override older information with newer information. Real time clock 191 can have an independent battery, that can preferably last from one month to ten years, or even longer, in order to provide the time of events stored in event memory 192.

A power management device, or program, 193 can be provided to adjust the operation according to the type of power used and to allow the power input to be switched between several different power supplies, such as the truck, stand alone battery coupled to locking device 20, solar panels or other appropriate, power supplies. In one form, the power management device 193 is used to automatically recharge the stand alone battery, whenever it is feasible, and senses the power left in the stand alone battery before the latch 30 is moved to the locked position in order to determine whether enough power is likely to be left afterwards to move the latch back to the unlocked position. If there is not enough power, ECU 100 can be programmed to trigger a visual or audible warning and either not move latch 30 to the locked position, or require the users to confirm that they want latch 30 moved to the locked position even though there may not be enough power left to move it back to the unlocked position. The locking device 20 can be configured to run on a variety of voltages, such as 12 VDC or 24 VDC. The power management device 30 can be used to sense or control any of the above described options associated with power management.

ECU 100 is electrically coupled to motor 47 and controls the operation of motor 47. As shown in FIG. 7, motor 47 can include a plurality of leads 70, 71 and 72 for providing electrical power to the motor. For example, lead 71 can be connected to ground, whereas lead 70 provides power to motor 47 to cause the motor shaft to rotate in the clockwise direction and lead 72 provides power to motor 47 to cause the motor shaft to rotate in the counterclockwise direction. Alternatively, a two lead version can be used where switching the polarity of the voltage changes the direction of rotation of motor 47.

ECU 100 includes outputs, such as two dedicated dry-contact outputs 102, for controlling the power provided to motor 47. In one form, ECU 100 sends a signal through one of dedicated dry-contact outputs 102 to cause power to be applied to lead 70, thereby rotating the shaft of motor 47 in the clockwise direction and extending latch 30 into the locked position. Similarly, ECU 100 can send a signal through the other output 102 to cause the shaft of motor 47 to rotate in the counterclockwise direction, thereby retracting latch 30 into the unlocked position. In one form, the previously mentioned signals activate a switch (or switches) to supply power to the appropriate leads 70 or 72.

ECU 100 can also include one or more inputs, such as two dedicated dry-contact inputs 104, that are coupled to sensors 64 and 65. For example, as latch 30 extends out of housing 32 into the locked position, actuator 66 passes and is sensed by optical sensor 64, which sends a signal to one of inputs 104 to indicate that latch 30 is in the locked position. Similarly, when latch 30 retracts back into housing 32 and moves to the unlocked position, actuator 66 passes near and is sensed by optical sensor 65, which sends a signal to the other of inputs 104 to indicate that latch 30 is in the unlocked position.

A receiver, such as RF receiver 106 is electrically coupled to ECU 100. A transmitter, such as an RF two channel key-fob transmitter 108, can be provided with two RF outputs to transmit signals to RF receiver 106. The signals transmitted from RF transmitter 108 are signals that are used to elicit a response from ECU 100. For example, one RF output signal of transmitter 108 can be used to cause ECU 100 to activate motor 47 and move latch 30 to the locked position. The other of the RF outputs of RF transmitter 108 can cause ECU 100 to activate motor 47 and move latch 30 to the unlocked position.

Alternatively, a RF three channel (or any other suitable number of channel) key-fob transmitter can be used. Multiple key-fob transmitters 108 can be provided and each might be separately coded so that the identity of the particular key-fob 108, and thus the individual entrusted with that key-fob, can be recorded in event memory 192 with any other appropriate information regarding the particular event. If a three channel fob is used, the third channel can be used to indicate an alarm condition or can be used as a master fob to enable, or disable, the ECU from responding to a signal from other fobs. In one form, the fobs are programmable in the field using a laptop, or handheld, computer.

ECU 100 can be provided with a plurality of other inputs or outputs 110. For example, three dedicated dry-contact inputs could be used to hardwire a key operated switch (like those found on some elevators) and a door open sensor. Two of inputs 110 can be used with the key operated switch, one for transmitting a lock command and the other for transmitting an unlock command. The third contact could be used with a sensor (similar to the mechanical sensor switch that turns on a refrigerator light) that produces a signal when the door is open. In one form, such sensor can take the form of a magnetic switch (see 75 in FIGS. 1 and 15) that sends a signal when the door is opened and, thus, moves away from the magnetic switch. In one form, the magnetic switch is a magnetic reed switch. Additional dry-contact inputs can be provided for additional external switches or sensors for connection to the door or other devices to cause the door to be locked or unlocked or to provide input from other appropriate devices.

Input/outputs 110 can also include a plurality of dry-contact outputs for feedback signals sent to other devices. Such signals can indicate that the latch is in the locked position or is unlocked, the door is closed or opened, or an error signal. In one form, an error signal is generated if two different sensors indicate opposite states, such as one sensor indicating that the latch 30 is in the locked position and the other sensor indicating that latch 30 is unlocked.

In one form, a signal is sent to a device, such as a camera, to activate the device when the vehicle door is opened. When a camera is used, a recording can be made of any loading and unloading activities when the door is opened. One, or more, feedback signals can be used to activate a siren or other warning device. In one form, a warning device is located in the cab and indicates that the door is unlocked or that the door is opened. In selected situations, an output signal can be used to lock the front of a cab hauling the cargo trailer 12 or to disable the engine. Other contacts can be provided to connect to an appropriate power source, such as a DC power source used for cargo transport vehicle 10. However, housing 32 could carry its own power source.

A plurality of serial ports 112, 113, such as a nine-pin connector communication port that is often referred to as RS-232, can be provided to interface with one or more auxiliary devices, such as a programming terminal or computer, a keypad, a telematic device, a GPS tracking device, a serial sensing device, or a modem. Such auxiliary devices can be used to send signals to ECU 100 to lock or unlock latch 30. They can also be used to program ECU 100 or to download information stored in ECU 100's memory or other memory associated with ECU 100. In one form, a keypad is provided that requires the entry of an employee identifying code to unlock the door so that a record of the unlocking of the door can be saved in memory. The telematic device and GPS tracking, device can be used to track the location of the cargo transport vehicle 10 when the cargo door is opened or unlocked and send the data to a remote location. In one form, ECU 100 is normally in the sleep mode and "awakens" when a command is sent or a signal is sent from one of the sensors or other devices.

Figure 18:
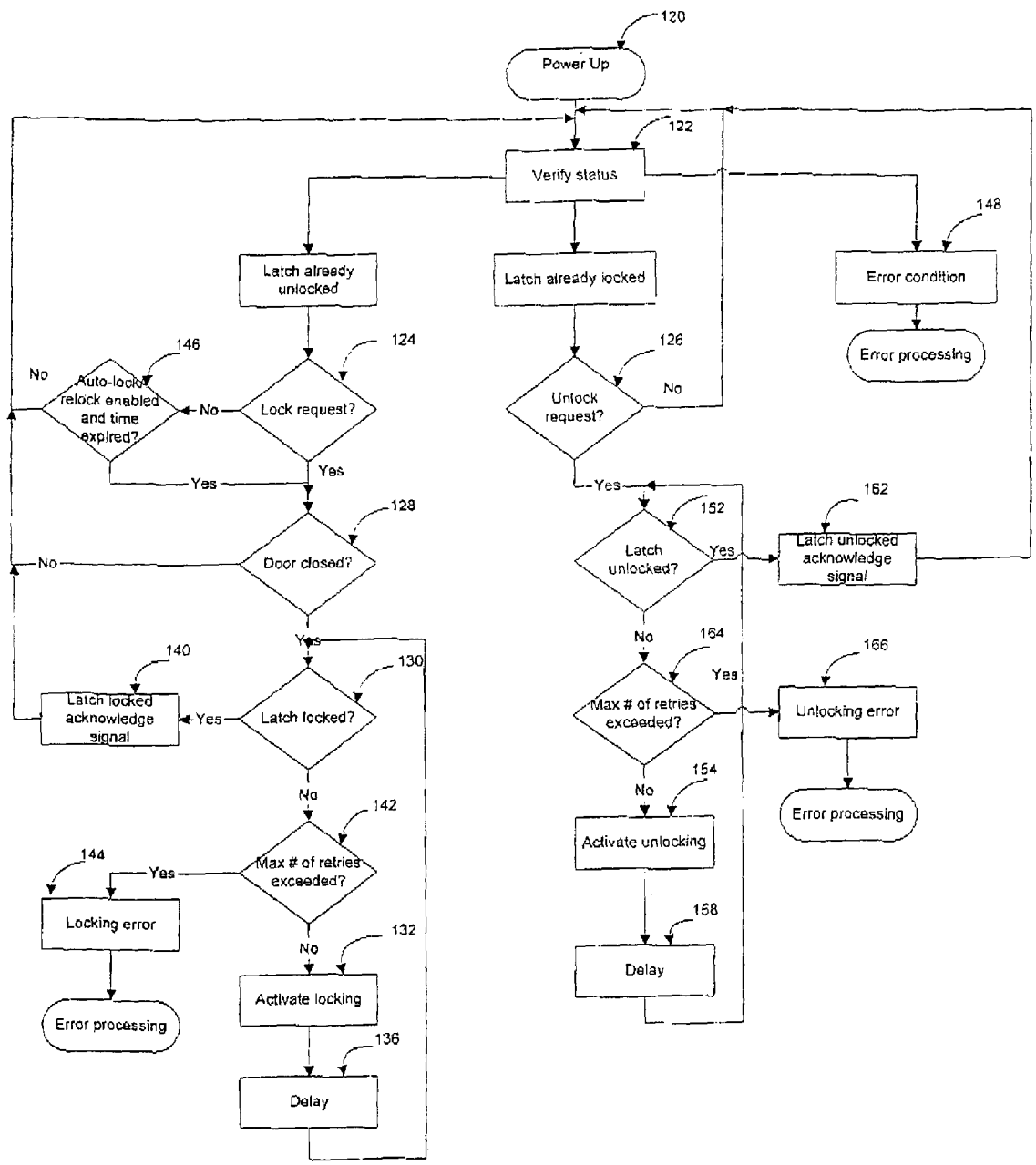
FIG. 18 is a flow chart for one example of a program that is run by the ECU of FIG. 17.
Figure 19:
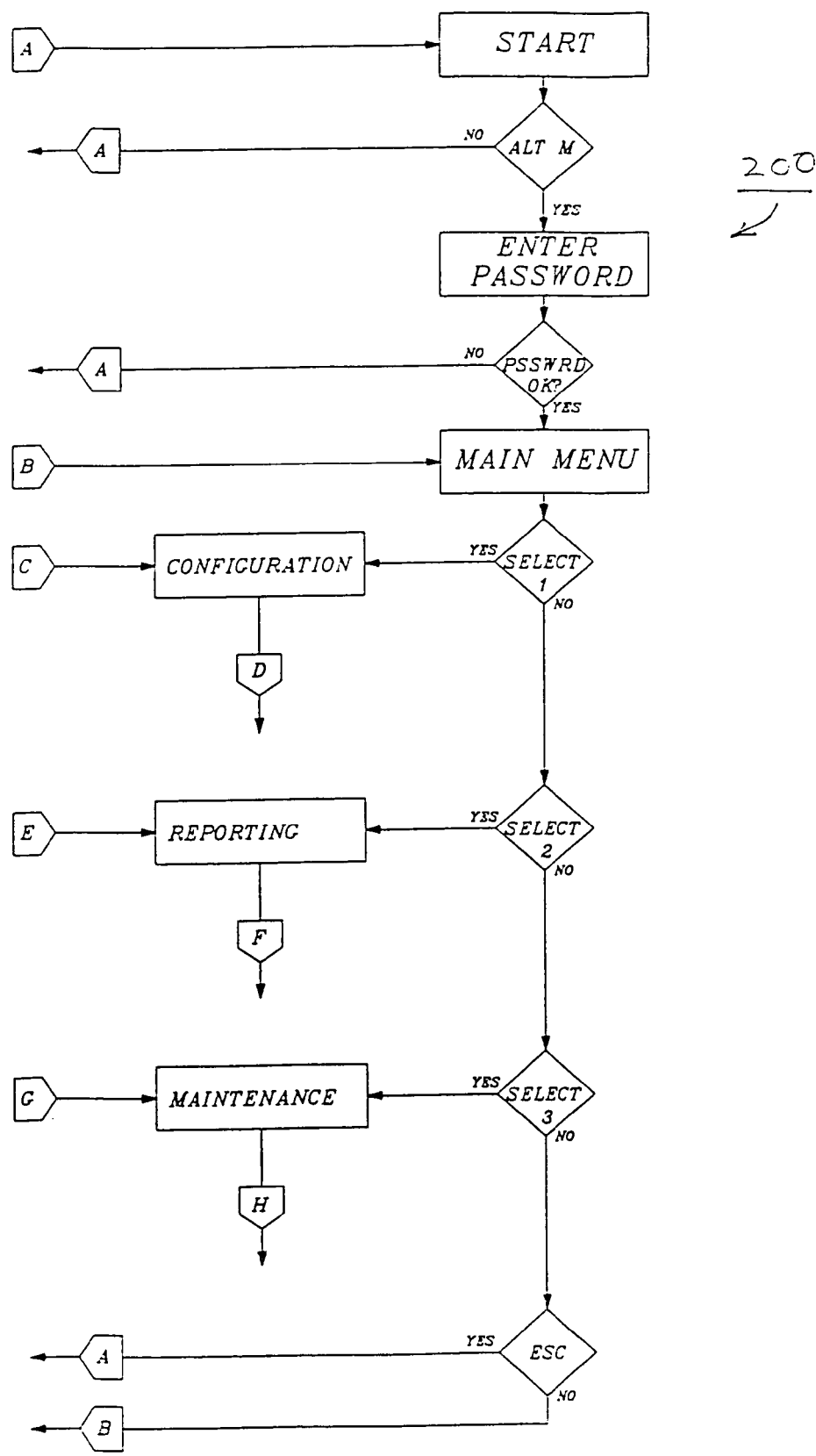

FIG. 18 shows a simplified example of a program that is run by ECU 100. Power is supplied to a locking device 20 at 120 from an appropriate power source, such as a rechargeable or replaceable power source that is part of locking device 20 or that is mounted separately. Alternatively, or in addition, power can be provided from the cargo transport vehicle 10 that is transporting cargo trailer 12. However, any other appropriate source of power can be used.

After being turned on, the power up process will include, but not be limited to, verification and status check of all states and sensor inputs. If an error condition 148 is detected during power up (e.g. locking device 20 in unknown state), the program may try to correct it by applying an automatic lock/unlock request and/or may signal this condition to the user by flashing an LED or by activating a buzzer. In normal situations, the ECU 100 will wait until a lock request 124 or unlock request 126 is supplied. In one form, the lock and unlock requests may come from an RF transmitter 108.

If the lock request 124 is generated, the program determines whether the door is closed at 128. If the door is not closed, the program goes back to verify status 122. However, if the door is closed at 128, the program verifies if the latch is already in the locked position at 130. If the latch is in the locked position, the program sends a latch locked acknowledge 140 signal and goes back to verify status 122. If the latch is not in the locked position, the program verifies if the maximum number of locking retries 142 is exceeded. This number could be programmed in the ECU 100 by the user to protect the locking device 20 in case an obstruction (e.g. ice, debris) prevents the latching process. If the maximum number of retries 142 is not exceeded, activate locking 132 command is generated.

At this time, the motor 47 is energized which causes the latch 30 to move to the locked position. There is a delay 136 needed for motor to operate, after which the program checks if the locking process was successful at 130. If the latch is in the locked position, the program sends a latch locked acknowledge 140 signal and goes back to verify status 122. If the latch is not in the locked position, the locking process is repeated, unless the number of locking retries 142 is exceeded. In that case, an error 144 is generated and the locking process stops. The maximum number of locking retries could be any number from 0, 1 to as much as 100 in some cases. The latch locked acknowledge 140 signal could be used to generate an output to the user, such as a chirp of the buzzer, an LED or an indicator light output, or an LCD screen output.

In one form, the system can be programmed to have an automatic lock/relock features 146 enabled and generate automatic lock requests. The automatic locking may occur when the user closes the door, but does not send a lock request 124 signal within a specified period of time. The automatic relocking may occur when the user requests the latch 30 to unlock, but does not open the door within a specified period of time. The time period can be programmed by the user from 0 to as much as 5 min, or even 10 min.

In some cases, not shown on FIG. 18, the ECU 100 could be programmed to accept a lock request signal even when the door is not closed. In one instance, the request could be memorized and executed by the ECU 100 after the door closure is detected. The lock request also could be executed when the door is open, since the construction of the latch 30 allows the door to close even when the latch 30 is in the locked position. During the closing, the latch 30 will move downwards compressing the spring 54 until it has cleared the latch receiving device 22. When the door is fully closed, the compressed spring 54 will cause latch 30 to move back to the locked position.

If the unlock request 126 is generated, the program determines whether the latch 30 is already in unlocked state at 152. If the latch is unlocked, the program sends a latch unlocked acknowledge 162 signal and goes back to verify status 122. If the latch is not unlocked, the program verifies if the maximum number of unlocking retries 164 is not exceeded. This number could be programmed in the ECU 100 by the user to protect the locking device 20 in case an obstruction (e.g. ice, debris) prevents the unlatching process. If the maximum number of retries 164 is exceeded, activate unlocking 154 command is generated.

At this time, the motor 47 is energized which causes the latch 30 to move to the unlocked position. There is a delay 158 needed for motor to operate, after which the program checks if the unlocking process was successful at 152. If the latch is unlocked, the program sends a latch unlocked acknowledge 162 signal and goes back to verify status 122. If the latch is not unlocked, the unlocking process is repeated, unless the number of unlocking retries 164 is exceeded. In that case, an error 166 is generated and the unlocking process stops. The maximum number of unlocking retries could be any number from 0, 1 to as much as 100 in some cases. The latch unlocked acknowledge 162 signal could be used to generate an output to the user, such as a chirp of the buzzer, an LED or an indicator light output, or an LCD screen output.

Figure 20:
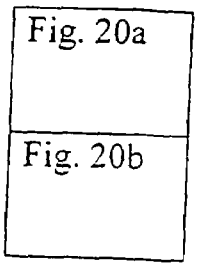
Figure 20A:
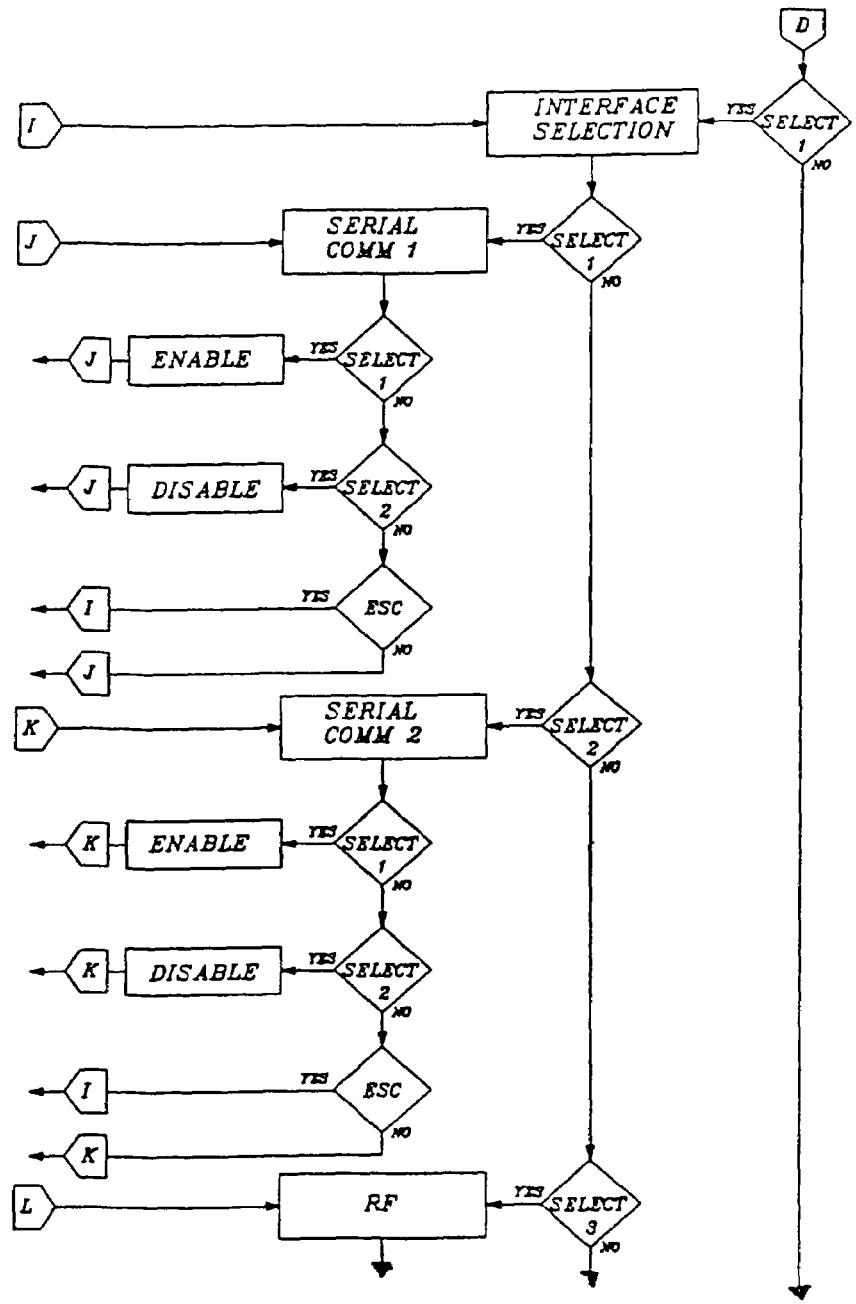
Figure 20B:
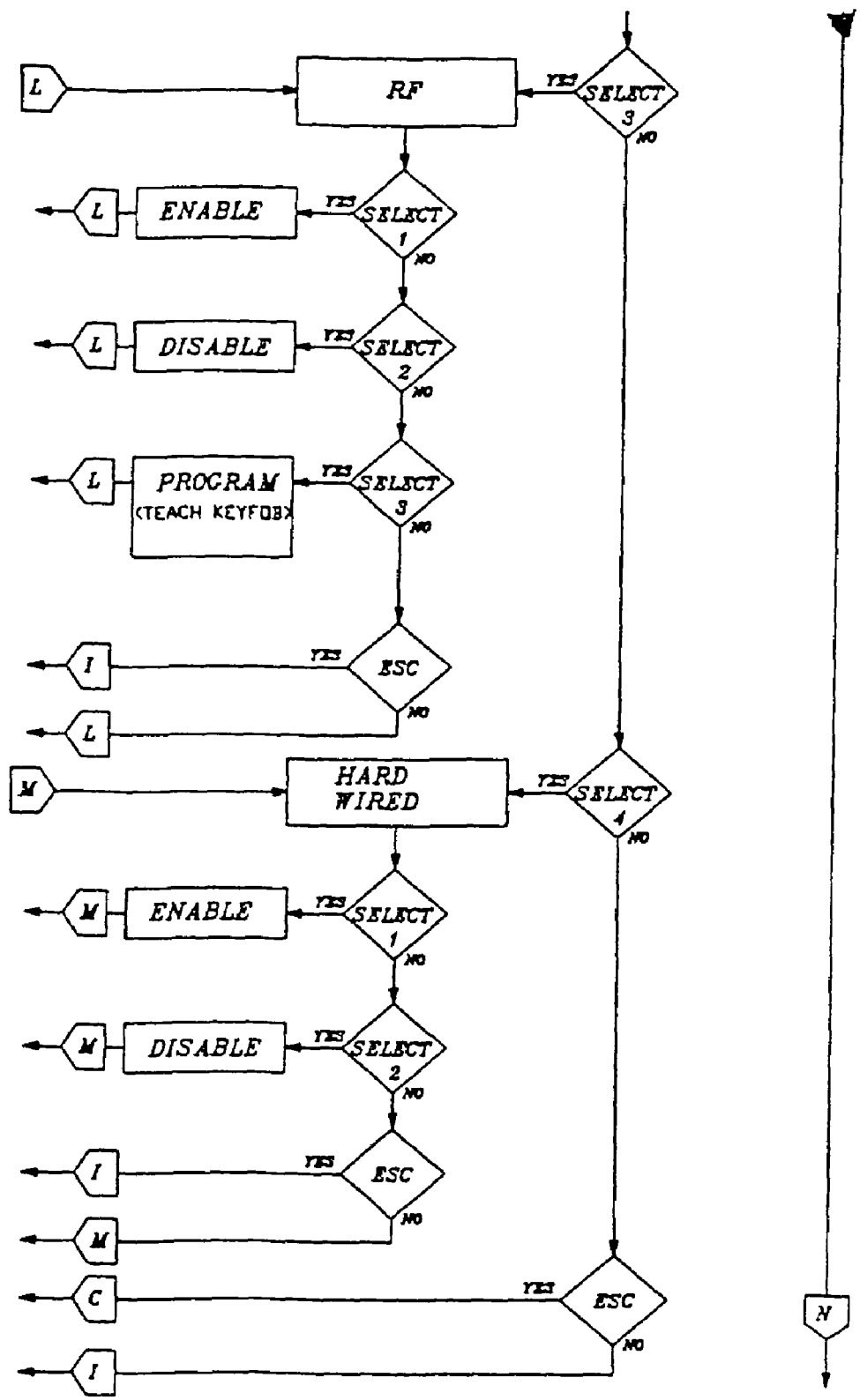
Figure 21B:
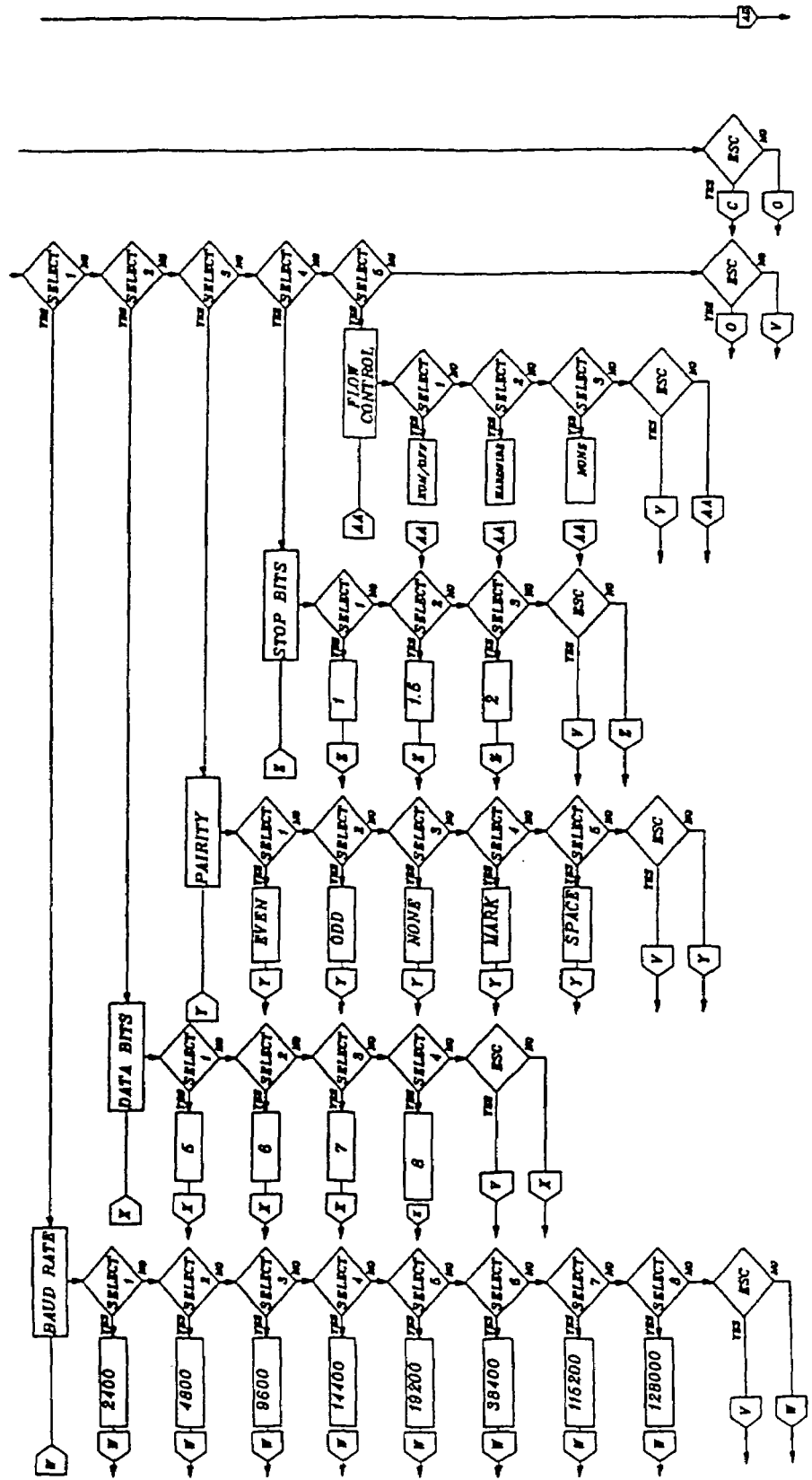
Figure 22:
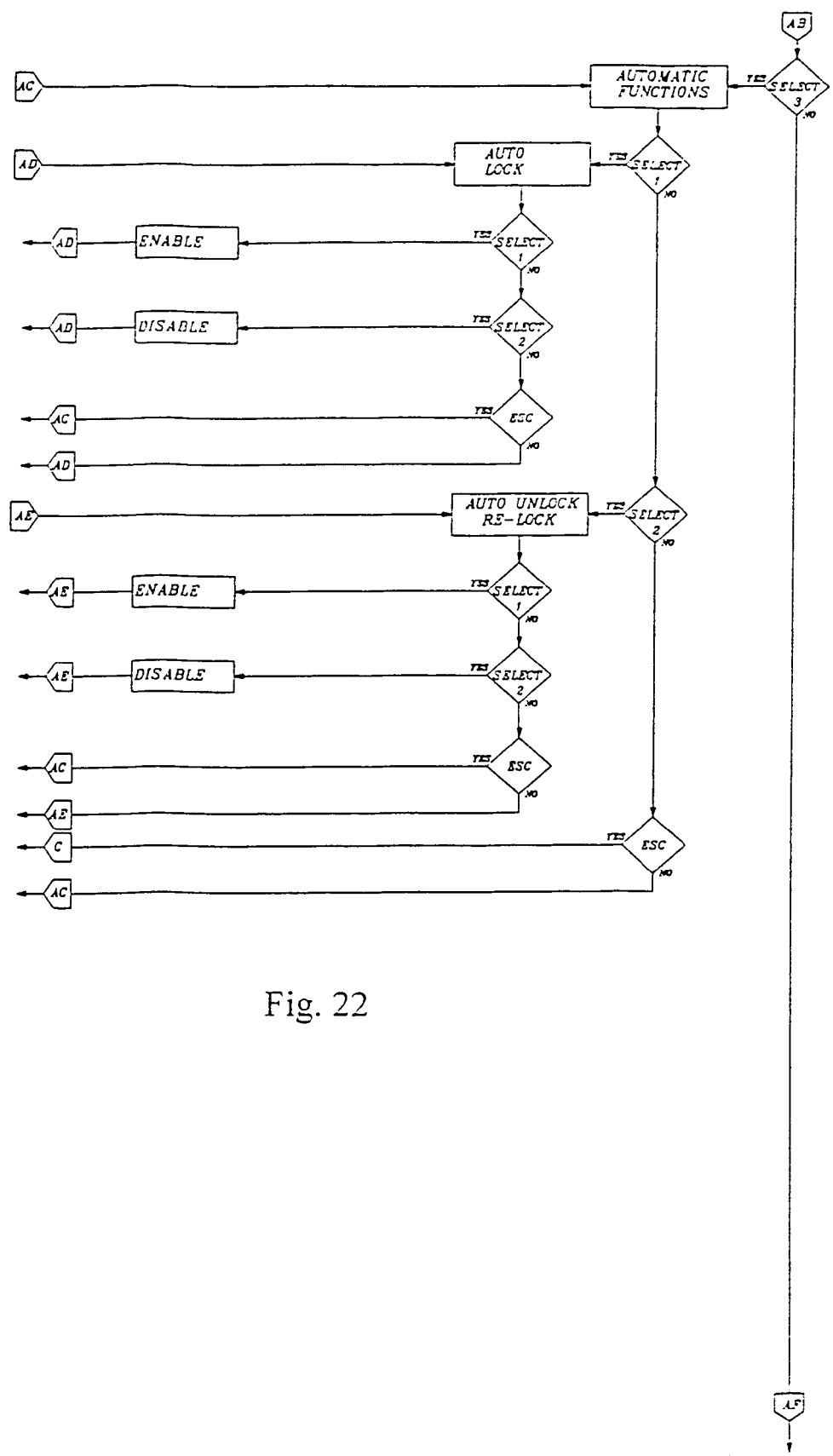
Figure 23:
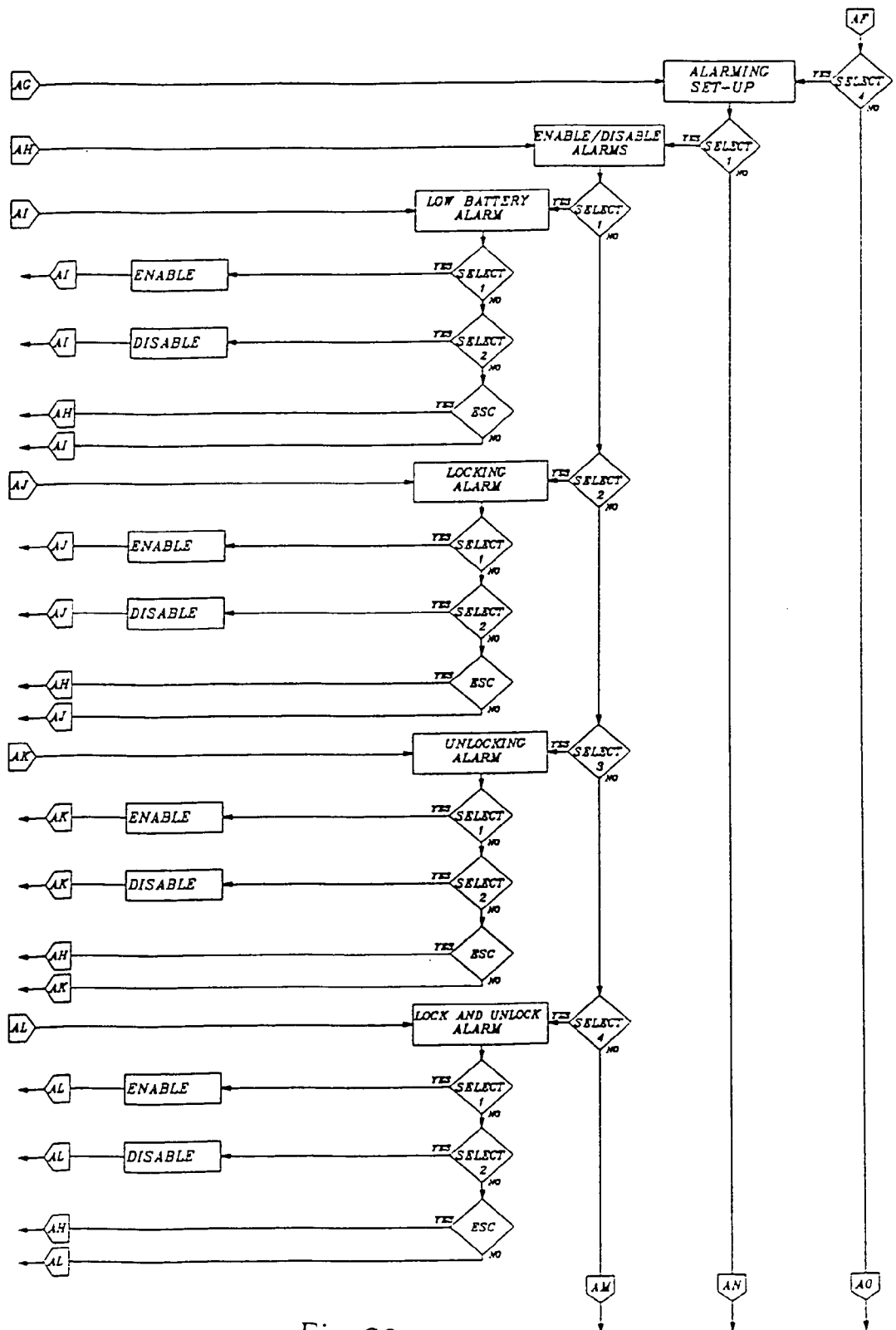
Figure 24:
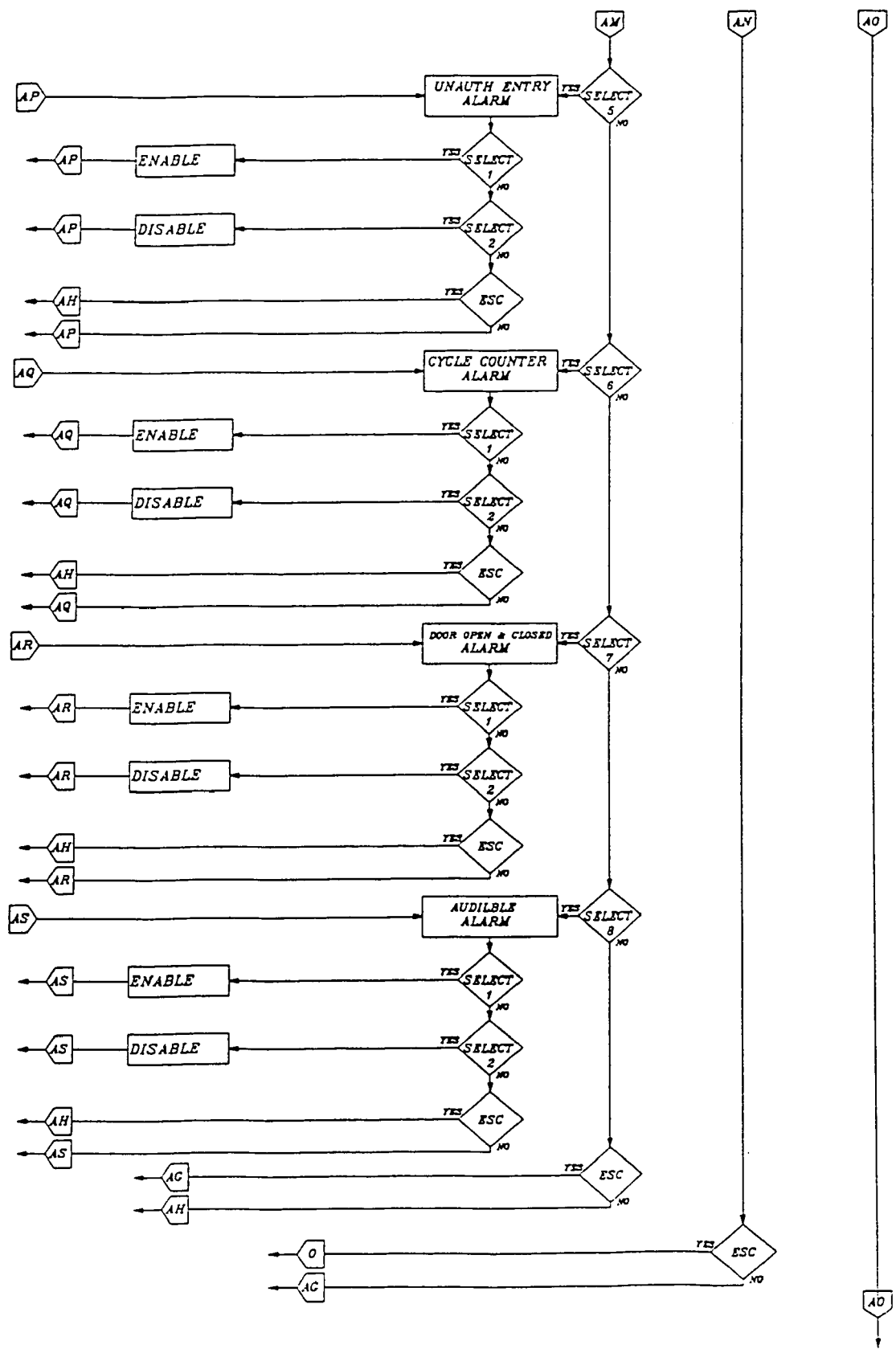

FIGS. 19–31 show a more complex program 200 that can be run by ECU 100. In one form, many different options are available to be configured. For example, the various input or output ports can be enabled, disabled, or otherwise configured at FIGS. 20 and 21. Input/output ports can be configured for a variety of baud rates, data bits, parity, stop bits, or flow control at FIG. 21. The automatic locking and automatic relocking features can be enabled or disabled at FIG. 22. Various alarms, or other warning devices, including low battery, locking, unlocking, a combination locking and unlocking, unauthorized entry, door open and closed, or cycle counter alarms can be enabled or disabled at FIGS. 23 and 24. In one form, such alarms can be sensed locally, such as through the use of audible alarms (see FIG. 24) or visual alarms.

Data concerning each alarm, or other event, can be stored locally in memory and may include the date, time, geographical location and a key-fob or individual associated with the alarm or event. In one form, one or more of the alarm signals can be transmitted to a remote location, via a cellular phone or telematic device connected to ECU 100, or other suitable method. A record of such alarms could be transmitted to a remote computer system or via the Internet for keeping track of a plurality of vehicles at the same time and storing similar data concerning such alarms or other events. In one form, a GPS device can be used so that alarms and data can be transmitted (and/or recorded locally) with the time and location of each occurrence. For example, if no unlock command is received and the door is sensed as open, data signifying the event (such as date, time, location and type of event) can be recorded locally and/or transmitted to a remote location and an alarm can occur locally and/or remotely.

Figure 25:
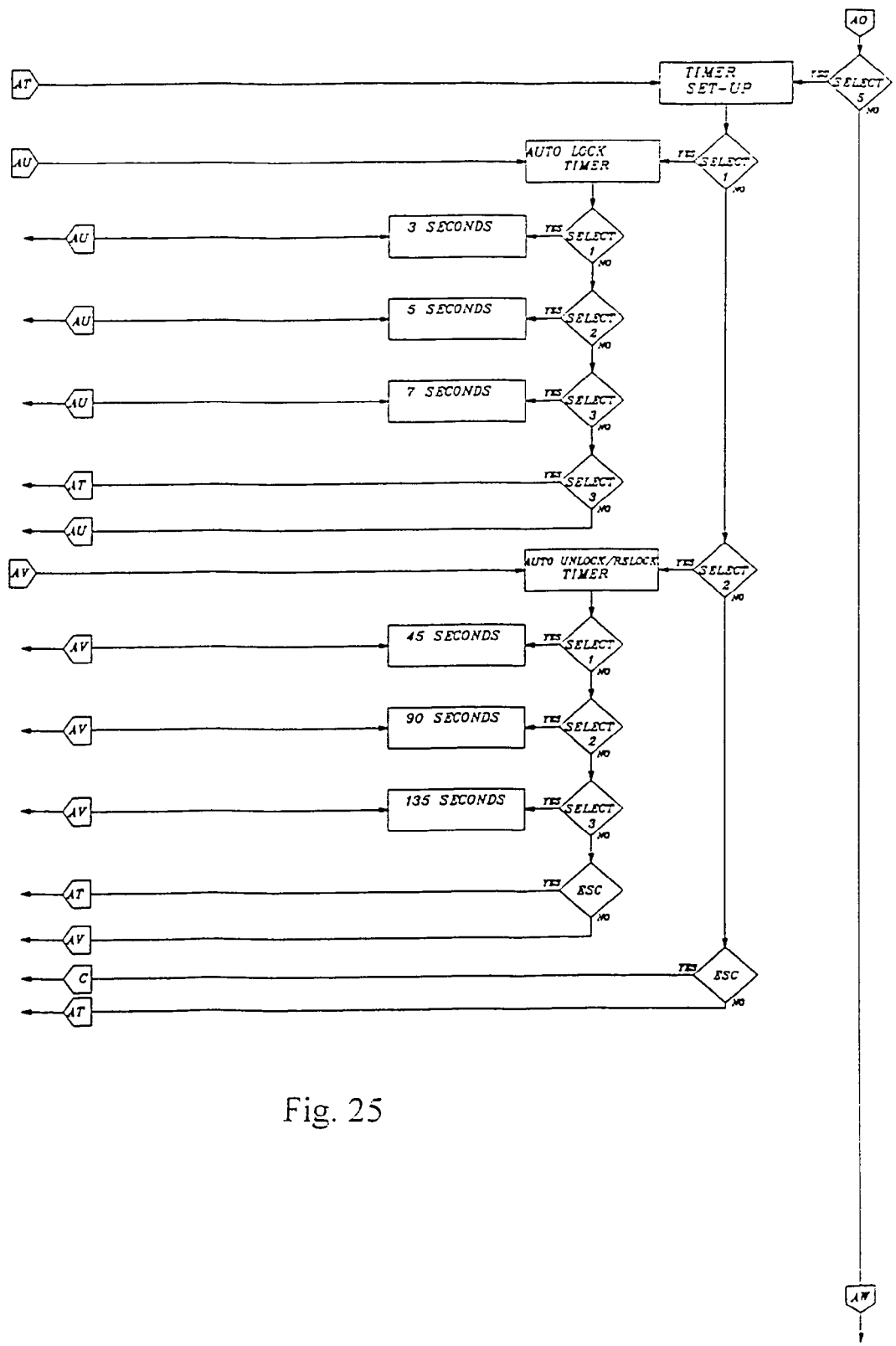
Figure 26:
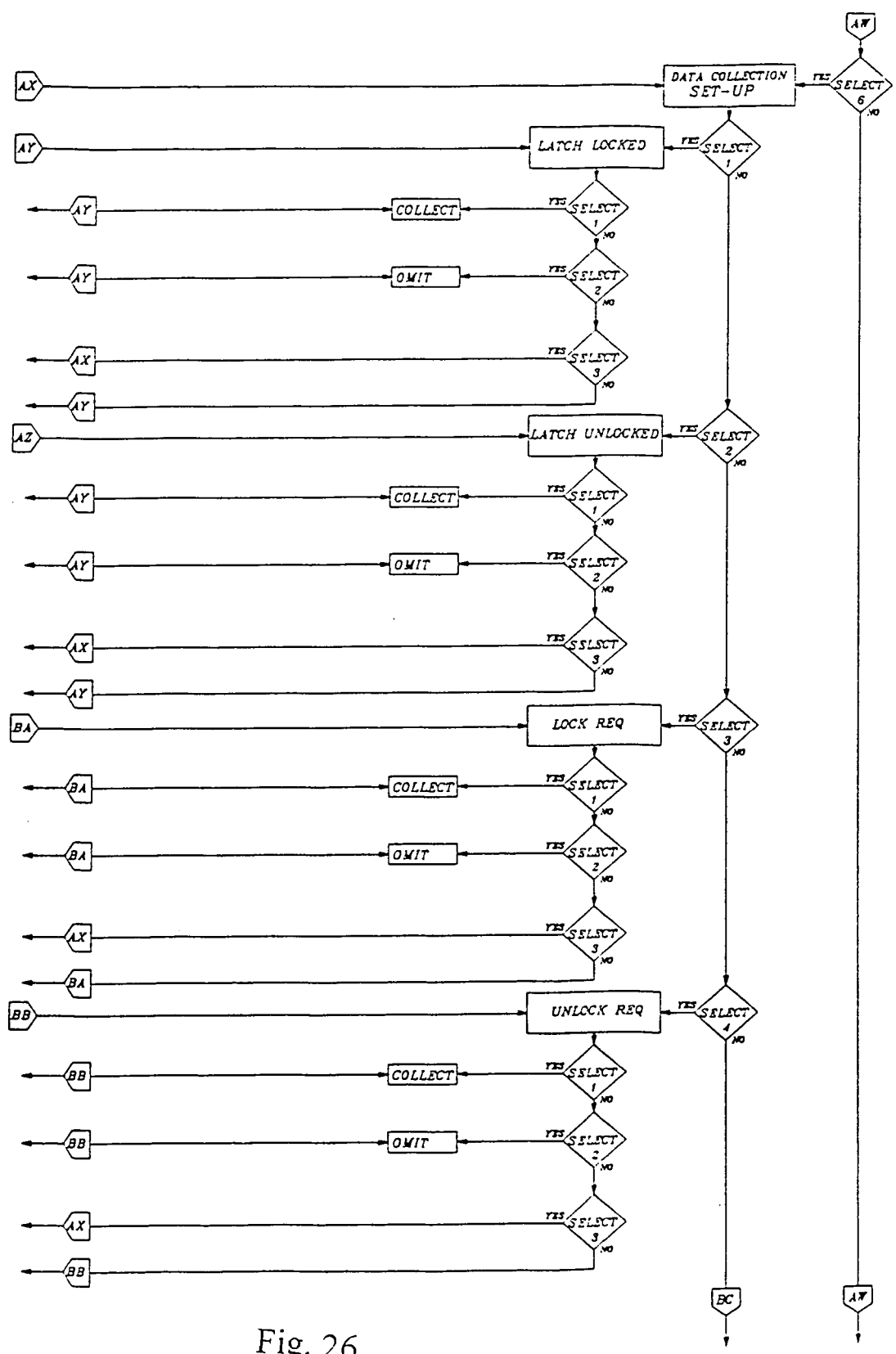
Figure 27:
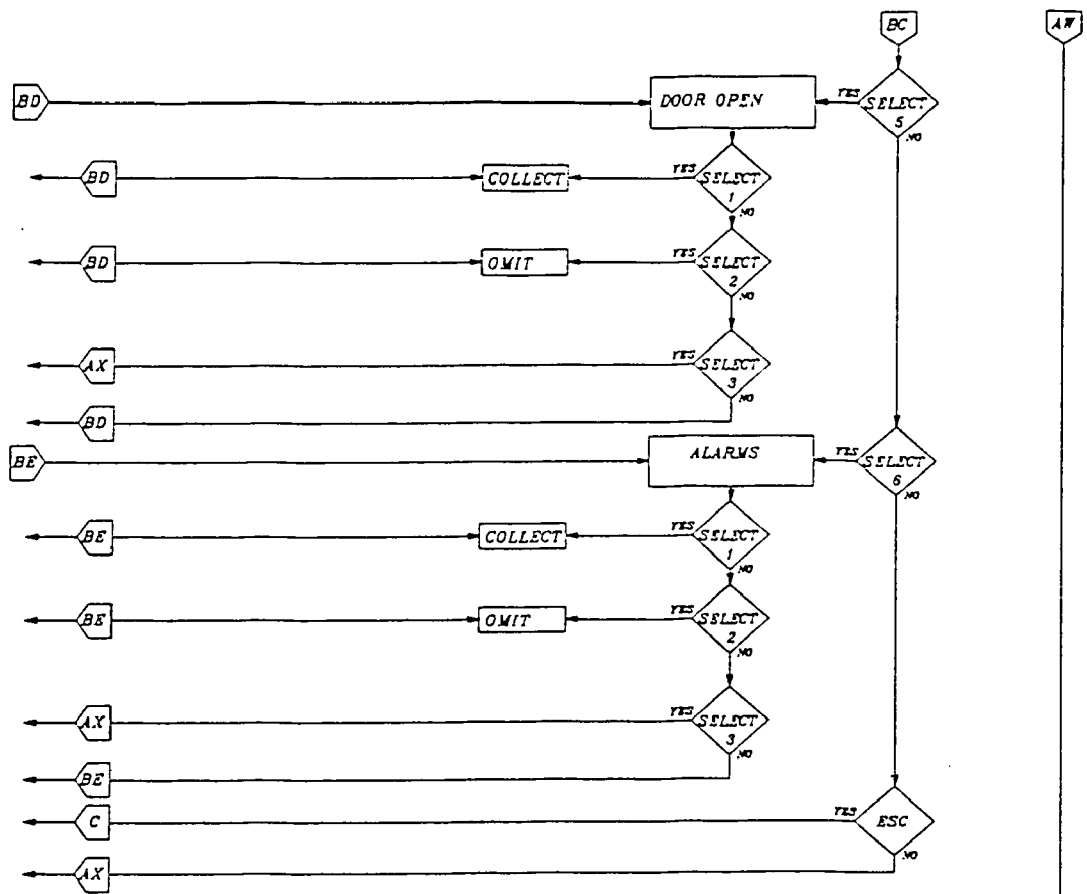

The amount of time for one, or more, delays can be selected at FIG. 25 and the type of data stored in memory, or transmitted to another location, can be selected at FIGS. 26 and 27. One, or multiple, cycle counters can be configured to count the number of times that the door is locked, unlocked, or opened at FIG. 28. Additionally, a cycle counter may keep track of the amount of time since the last time locking device 20 was serviced. The cycle counters and cycle counter alarms can be used to note when locking device 20, or a portion thereof, should be serviced.

Figure 28:
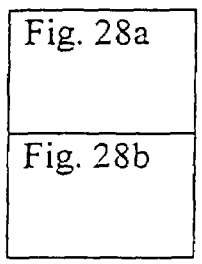
Figure 28A:
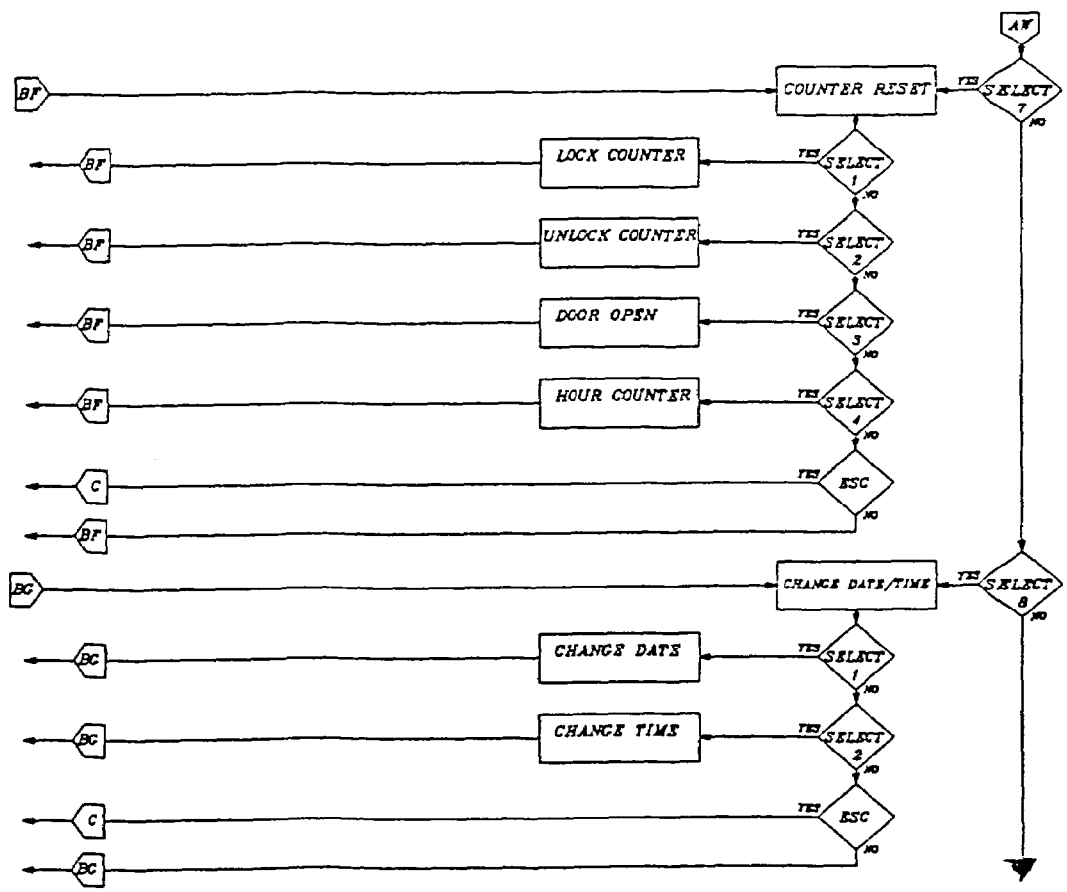
Figure 28B:
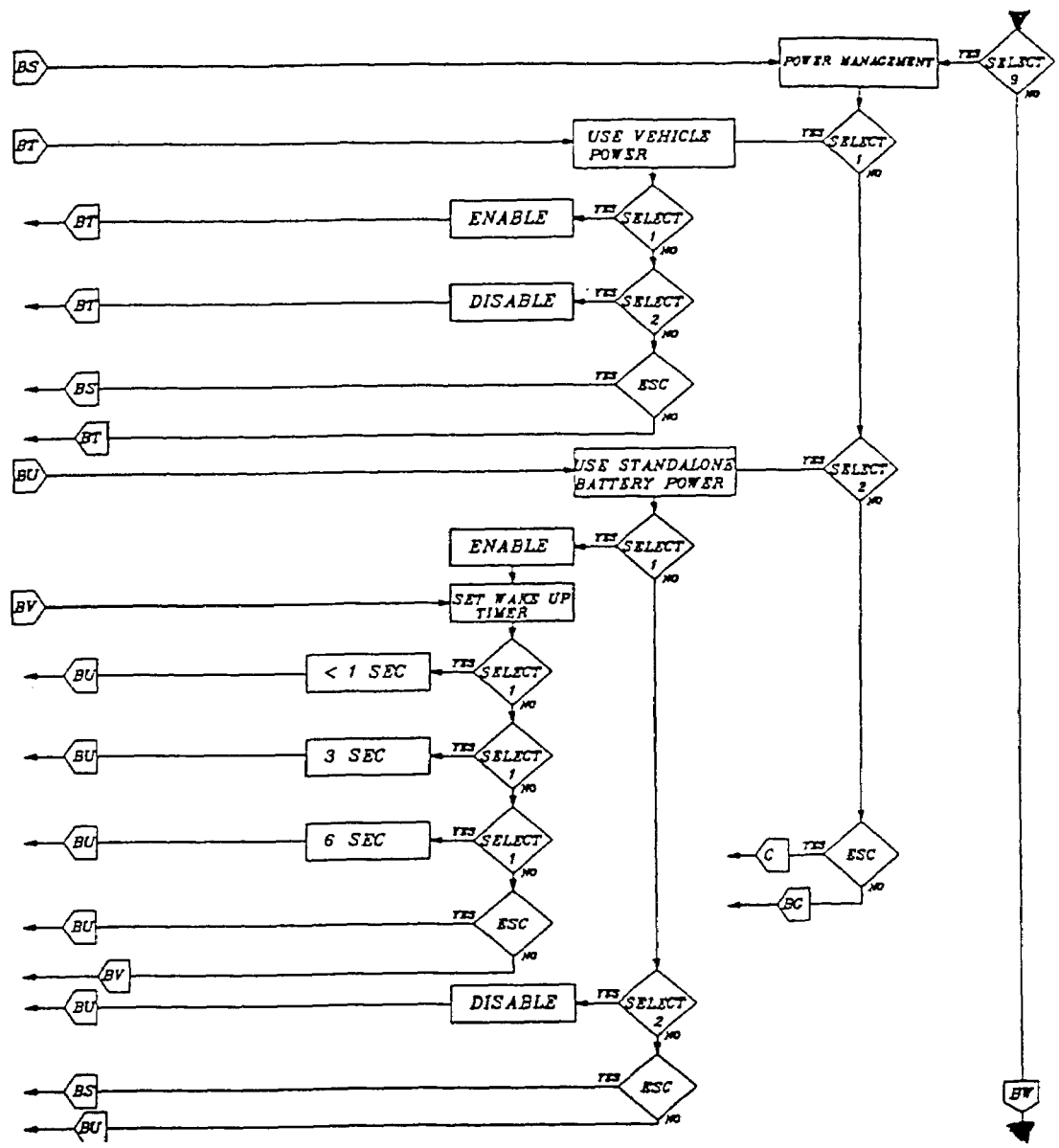
Figure 30:
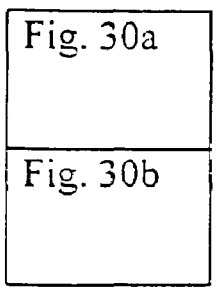
Figure 30A:
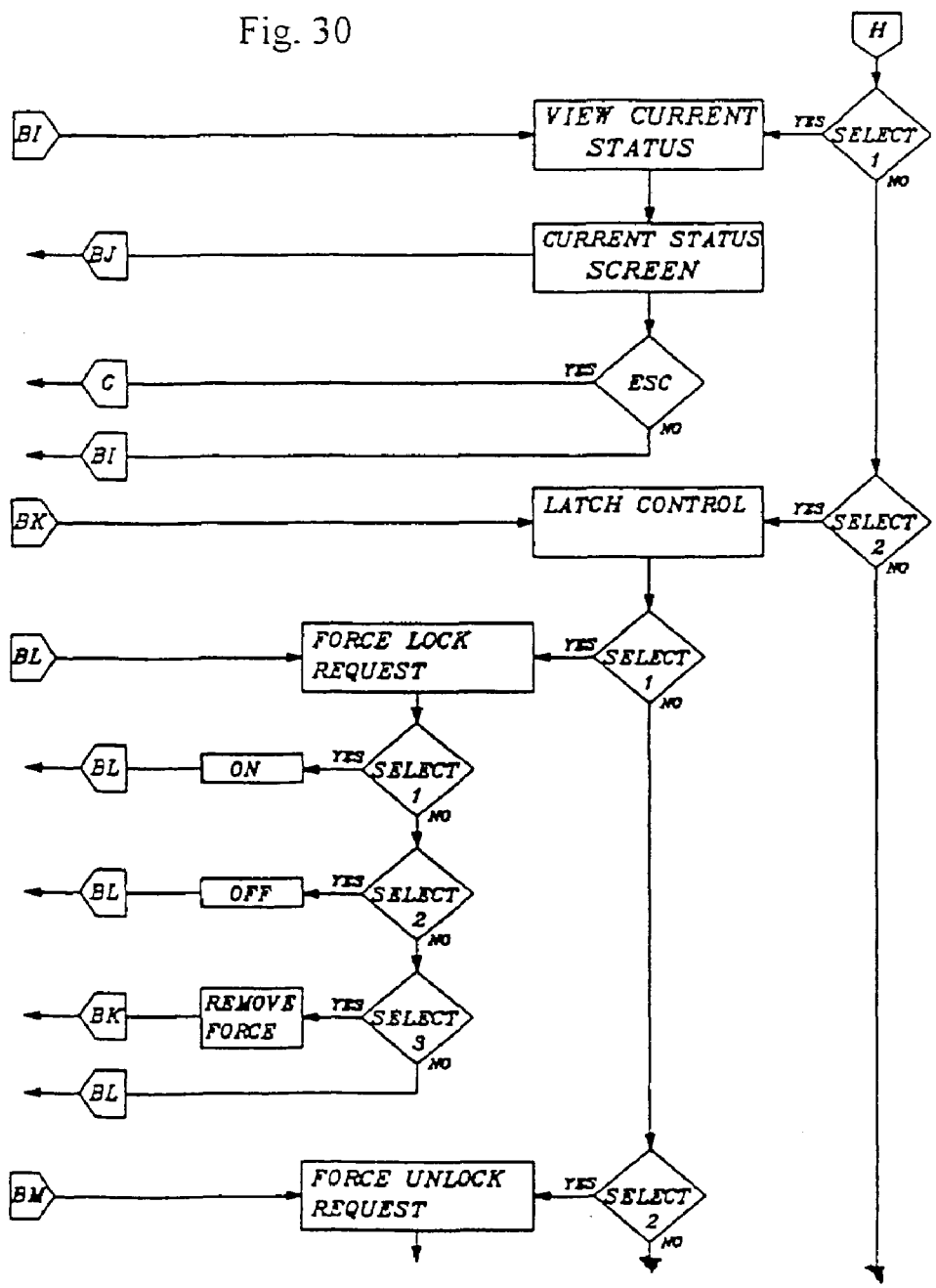
Figure 30B:
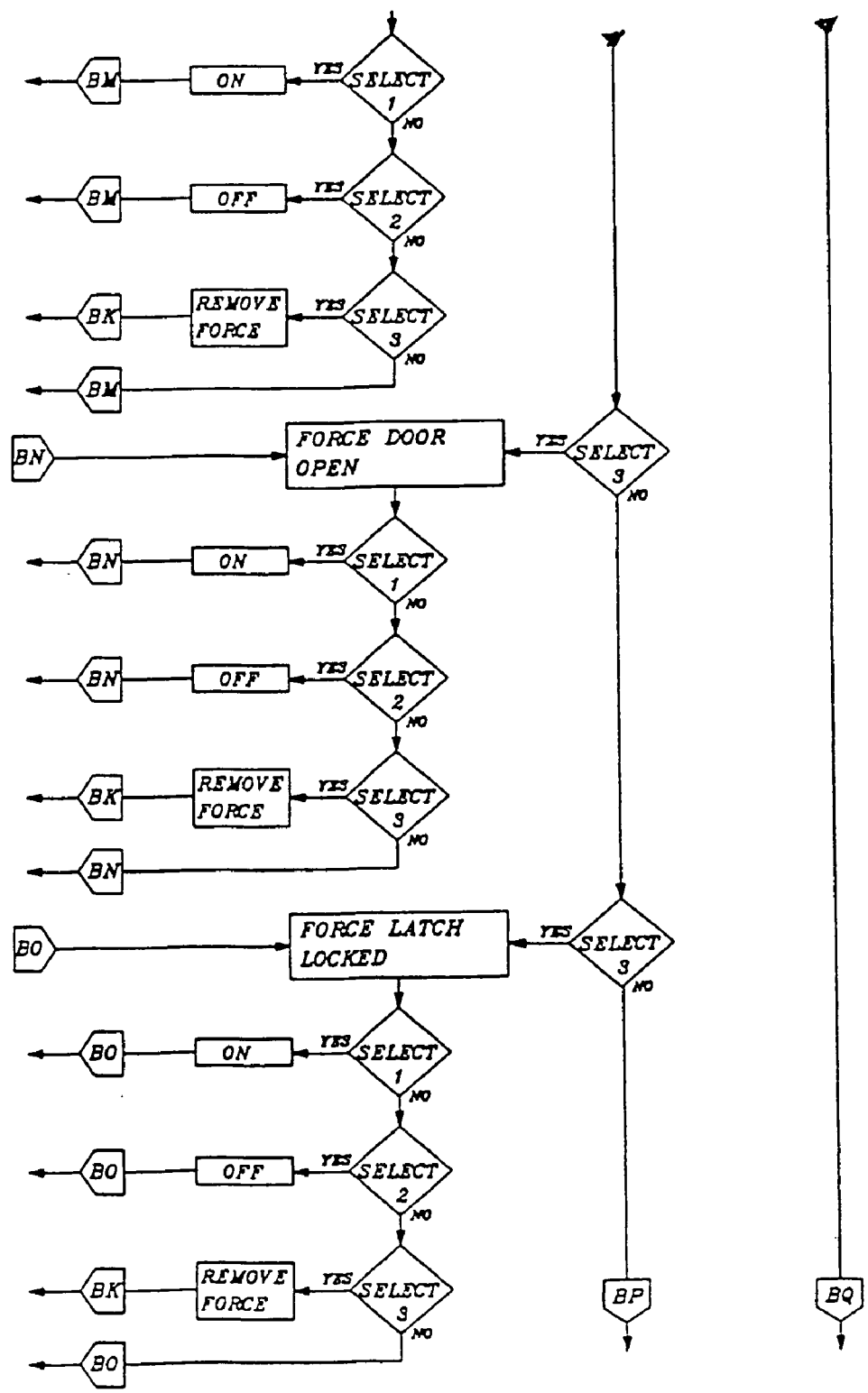
Figure 31:
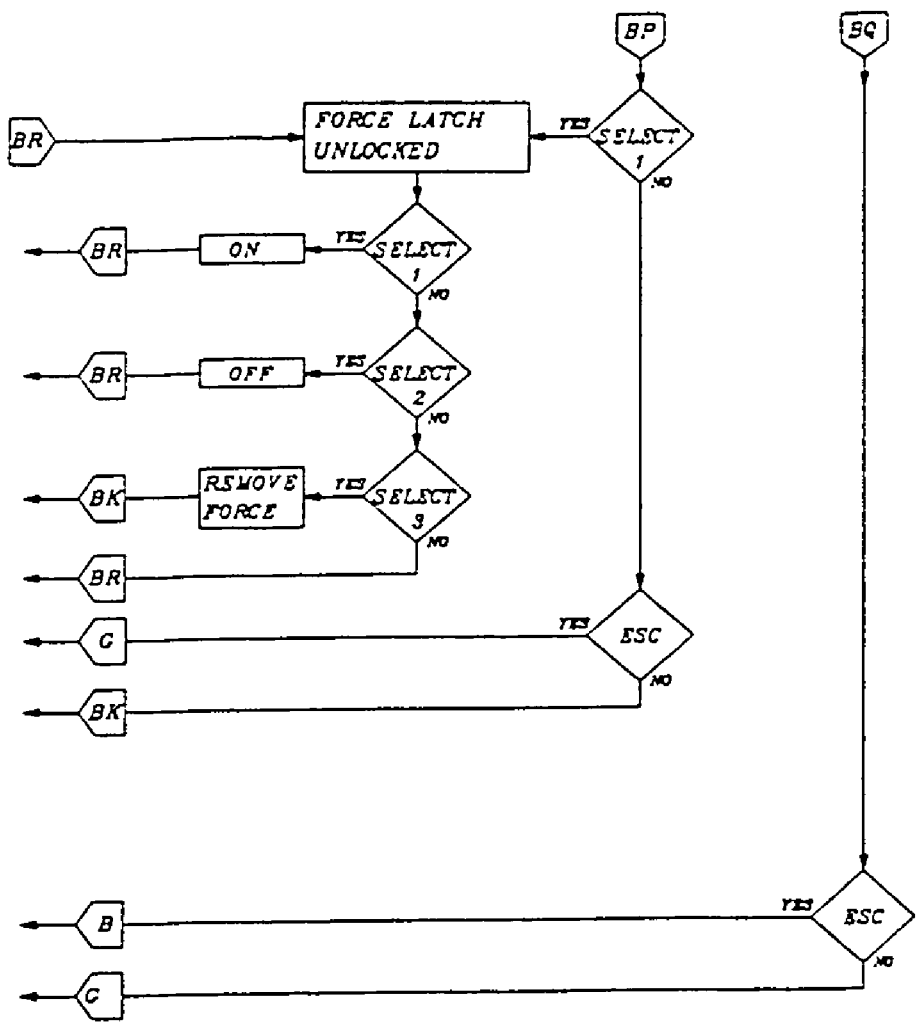
Figure 34:
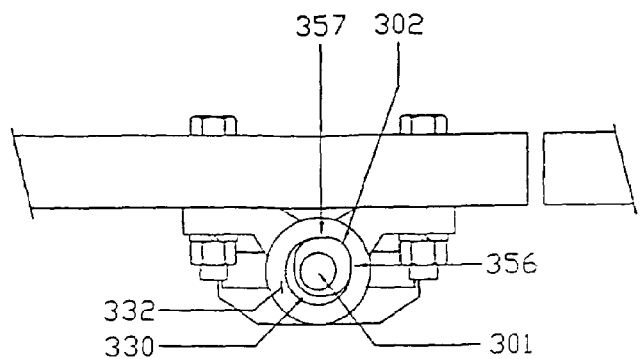
FIGS. 32–37 is an alternate form of a locking device in accordance with the principles of the present invention.

The use of vehicle power or standalone power can also be enabled or disabled at FIG. 28. If the use of standalone power is enabled, a sleep mode can be used to conserve energy. In this case, a wake up period can be selected (at FIG. 28) so that the system wakes up periodically and checks the various sensors to see what status everything is in, or checks the input/output status, and compares the status with the status that is stored in memory. If necessary, the system signals the appropriate alarms, and transmits any appropriate alarms or other signals. For example, if the stored data indicates the latch should be in the locked position, but the sensor indicates that the latch is in the unlocked position, the processor can automatically activate the motor to cause the latch to move back to the locked position. If a signal command is made while the system is in sleep mode, the system will disregard the timer and wake up to execute the appropriate command. The timer can then be reset and the system can return to idle mode. Other options are shown in FIGS. 29–31, which are evident from the figures.

Some, or all, of the above options might be configurable and reconfigurable by the user. For example, the configuration of the software can be updated, or the preferences changed in the field, by connecting a laptop (or other appropriate device) to an input of the ECU. Some, or all, of the options might be pre-configured by the manufacturer or reseller to allow the same device to be sold at different price points depending on the options desired by the user.

Additionally, a memory can be provided to keep a running record of the locking and unlocking commands and/or other operations along with other signals sent or received by ECU 100. In one form, such memory is coupled to ECU 100 and the record can be downloaded to another device, such as a portable computer, via one of the input/output contacts of ECU 100. Additionally, the program can cause an indication that maintenance is needed, such as by using a service light or indicating service is required on a screen. Such screen can be located on a device having a numeric keypad. Examples of service required could be replacement of wear pads or other parts, cleaning and/or greasing latching device 28, or replacing the coil spring.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A cargo transport vehicle including a cargo container comprising;
   a cargo door accessible from the outside for closing the container and being movable from an open position to a closed position;
   a latching device on the inside of the container, the latching device having a latch, a screw for moving the latch between an unlocked position and a locked position, and a motor for turning the screw, wherein the motor turns the screw in one direction and thereby moves the latch from the unlocked position to the locked position and the motor turns the screw in the direction opposite of said one direction and thereby moves the latch from the locked position to the unlocked position wherein the screw has threads with a degree of pitch no greater than 5 degrees.

2. A cargo transport vehicle as defined in claim 1, further comprising a pre-compressed spring coupled to the latch and the screw for exerting a force to increase friction and prevent back rotation of the screw.

3. A cargo transport vehicle as defined in claim 1, including a sensing device for determining the position of the latch.

4. A cargo transport vehicle as defined in claim 1, including a latch receiving device, adapted to receive the latch, located on the inside of the container, adjacent to the cargo door.

5. A method for securing the cargo of a trailer having a container and cargo door accessible from the outside for closing the container and being movable from an open position to a closed position, the method comprising:
   providing a latching device on the inside of the container, the latching device having a latch, a screw for moving the latch between an unlocked position and a locked position, and a motor for turning the screw;
   turning the screw in one direction to thereby move the latch from the unlocked position to the locked position;
   turning the screw in the direction opposite of said one direction and thereby moving the latch from the locked position to the unlocked position;
   providing a pre-compressed spring coupled to the latch and the screw for exerting a force to increase friction and prevent back rotation of the screw.

6. A method of using a latching device for securing a cargo door of a cargo trailer, the method comprising:
   providing a housing having an enclosure;
   providing a latch member moveably positioned in the enclosure, the latch member movable from an unlocked position and a locked position;
   providing a drive mechanism, coupled to the latch member, that moves the latch member within the enclosure, the drive mechanism including a motor, spring coupler, a drive screw attached to the motor through the spring coupler, a drive nut threaded on the drive screw; and a spring disposed between the drive nut and the latch member, wherein the drive mechanism moves the latch member to the locked position by utilizing the motor to turn the drive screw in a first direction such that the drive nut advances down the drive screw and bears against the spring, which pushes the latch member to the locked position, and wherein the drive mechanism moves the latch member to the unlocked position by utilizing the motor to turn the drive screw in a second direction such that the drive nut moves up the drive screw and pulls the spring which retracts the latch member to the unlocked position;
   providing a controller coupled to the motor that controls movement of the latch,
   utilizing the motor to turn the drive screw in the first direction to advance the latch member to the locked position,
   if the latch is blocked from advancing to the locked position, allowing the drive nut to compress the spring for a predetermined amount of time, and
   stopping the motor from turning the drive screw after the predetermined amount of time.

7. A method of using a latching device for securing a cargo door of a cargo trailer, the method comprising:
   providing a housing having an enclosure;
   providing a latch member moveably positioned in the enclosure, the latch member movable from an unlocked position and a locked position;

providing a drive mechanism, coupled to the latch member, that moves the latch member within the enclosure, the drive mechanism including a motor, spring coupler, a drive screw attached to the motor through the spring coupler, a drive nut threaded on the drive screw; and a spring disposed between the drive nut and the latch member, wherein the drive mechanism moves the latch member to the locked position by utilizing the motor to turn the drive screw in a first direction such that the drive nut advances down the drive screw and bears against the spring, which pushes the latch member to the locked position, and wherein the drive mechanism moves the latch member to the unlocked position by utilizing the motor to turn the drive screw in a second direction such that the drive nut moves up the drive screw and nulls the spring which retracts the latch member to the unlocked position;

providing a controller coupled to the motor that controls movement of the latch, utilizing the motor to turn the drive screw in the second direction to retract the latch member from the locked position to the unlocked position, if the latch is blocked from retracting to the unlocked position, allowing the drive nut to extend the spring coupler for a predetermined amount of time, and stopping the motor from turning the drive screw after the predetermined amount of time.

* * * * *